United States Patent
Zhang et al.

(10) Patent No.: US 12,189,073 B2
(45) Date of Patent: Jan. 7, 2025

(54) ERGODIC GEOPHYSICAL DATA ACQUISITION DESIGN

(71) Applicant: Colorado School of Mines, Golden, CO (US)

(72) Inventors: Mengli Zhang, Golden, CO (US); Yaoguo Li, Golden, CO (US)

(73) Assignee: Colorado School of Mines, Golden, CO (US)

( * ) Notice: Subject to any disclaimer, the term of this patent is extended or adjusted under 35 U.S.C. 154(b) by 231 days.

(21) Appl. No.: 17/877,304

(22) Filed: Jul. 29, 2022

(65) Prior Publication Data

US 2023/0030573 A1    Feb. 2, 2023

Related U.S. Application Data

(60) Provisional application No. 63/227,736, filed on Jul. 30, 2021.

(51) Int. Cl.
    *G01B 21/30*    (2006.01)
    *G01V 1/38*    (2006.01)
    *G06F 18/21*    (2023.01)

(52) U.S. Cl.
    CPC ........... *G01V 1/3808* (2013.01); *G01B 21/30* (2013.01); *G06F 18/21* (2023.01)

(58) Field of Classification Search
    CPC ........ G01V 1/3808; G06F 18/21; G01B 21/30
    See application file for complete search history.

(56) References Cited

U.S. PATENT DOCUMENTS

| | | |
|---|---|---|
| 2012/0090807 A1 | 4/2012 | Stewart et al. |
| 2013/0261981 A1 | 10/2013 | Fournier et al. |
| 2014/0041876 A1 | 2/2014 | Fleckenstein et al. |
| 2015/0159462 A1 | 6/2015 | Cutler |
| 2015/0212233 A1 | 7/2015 | Diaz Campos et al. |
| 2015/0300327 A1 | 10/2015 | Sweatman et al. |
| 2017/0321934 A1 | 11/2017 | Kruger |
| 2018/0363439 A1 | 12/2018 | Fehr et al. |
| 2020/0217181 A1 | 7/2020 | Norbeck et al. |
| 2021/0003320 A1 | 1/2021 | Toews et al. |

FOREIGN PATENT DOCUMENTS

WO    WO 2017/035370     3/2017

OTHER PUBLICATIONS

Zhang et al., "Efficient ground EM acquisition using irregular sparse stations: A compressive sensing approach," Center for Gravity, Electrical, and Magnetic Studies, Dept. of Geophysics, Colorado School of Mines, Jul. 20, 2021, 36 pages.

(Continued)

*Primary Examiner* — Isam A Alsomiri
*Assistant Examiner* — Abdallah Abulaban
(74) *Attorney, Agent, or Firm* — Sheridan Ross P.C.

(57) ABSTRACT

Determining locations to gather information to reduce the number of locations without reducing the information gathered is of key importance when such observations require drilling or other resource-intensive activities. By utilizing ergodic sampling, the same information (volume and/or resolution) may be obtained when compared to an exhaustive grid approach but with significantly fewer observations.

20 Claims, 37 Drawing Sheets

(56) References Cited

OTHER PUBLICATIONS

Zhang et al., "Efficient ground EM acquisition using irregular sparse stations: A compressive sensing approach," First International Meeting for Applied Geoscience & Energy Expanded Abstracts, 2021, 4 pages.

Zhang et al., "Efficient mineral reserve estimation using Ergodic sampling," Center for Gravity, Electrical, and Magnetic Studies, Dept. of Geophysics, Colorado School of Mines, Jul. 19, 2021, 5 pages.

Zhang et al., "Ergodic in-fill acquisitions in geoscience: Integration of efficient acquisition and fast interpretation," Center for Gravity, Electrical, and Magnetic Studies, Dept. of Geophysics, Colorado School of Mines, Jul. 20, 2021, 7 pages.

Zhang et al., "Ergodic sampling: Application in efficient MT and seismic acquisition and Mars exploration," Center for Gravity, Electrical, and Magnetic Studies, Dept. of Geophysics, Colorado School of Mines, Jul. 20, 2021, 44 pages.

Zhang et al., "Line-based ergodic sampling: Application in airborne Magnetic and DAS acquisitions," Center for Gravity, Electrical, and Magnetic Studies, Dept. of Geophysics, Colorado School of Mines, Jul. 20, 2021, 18 pages.

Zhang et al., "Relationship between Nyquist sampling and Ergodic sampling: Application in multi-scale geophysical inversion with ergodic data misfit functions," Center for Gravity, Electrical, and Magnetic Studies, Dept. of Geophysics, Colorado School of Mines, Jul. 20, 2021, 6 pages.

Zhang, "Efficient 3D seismic acquisition design using compressive sensing," Center for Gravity, Electrical, and Magnetic Studies, Dept. of Geophysics, Colorado School of Mines, Jul. 12, 2021, 39 pages.

International Preliminary Report on Patentability for International (PCT) Patent Application No. PCT/US2022/041733, dated Feb. 8, 2024, 5 pages.

International Search Report and Written Opinion for International (PCT) Patent Application No. PCT/US2022/041733, dated Dec. 7, 2022, 9 pages.

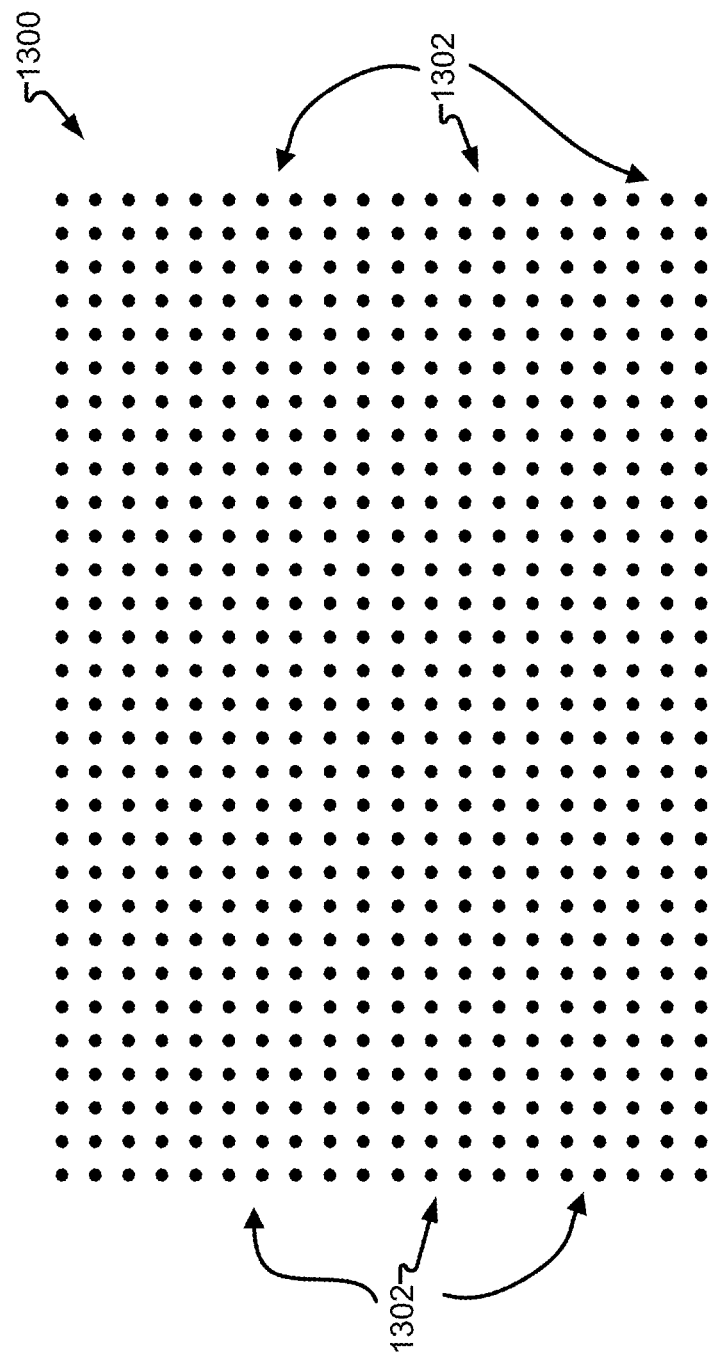

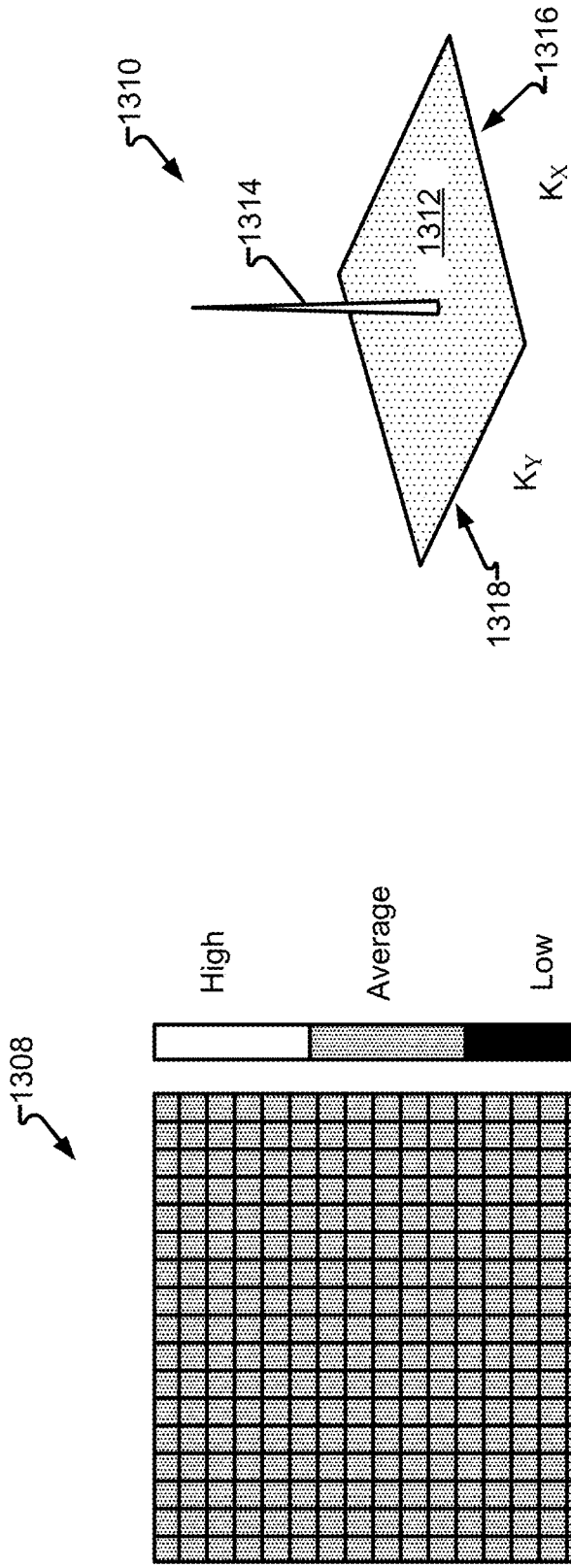

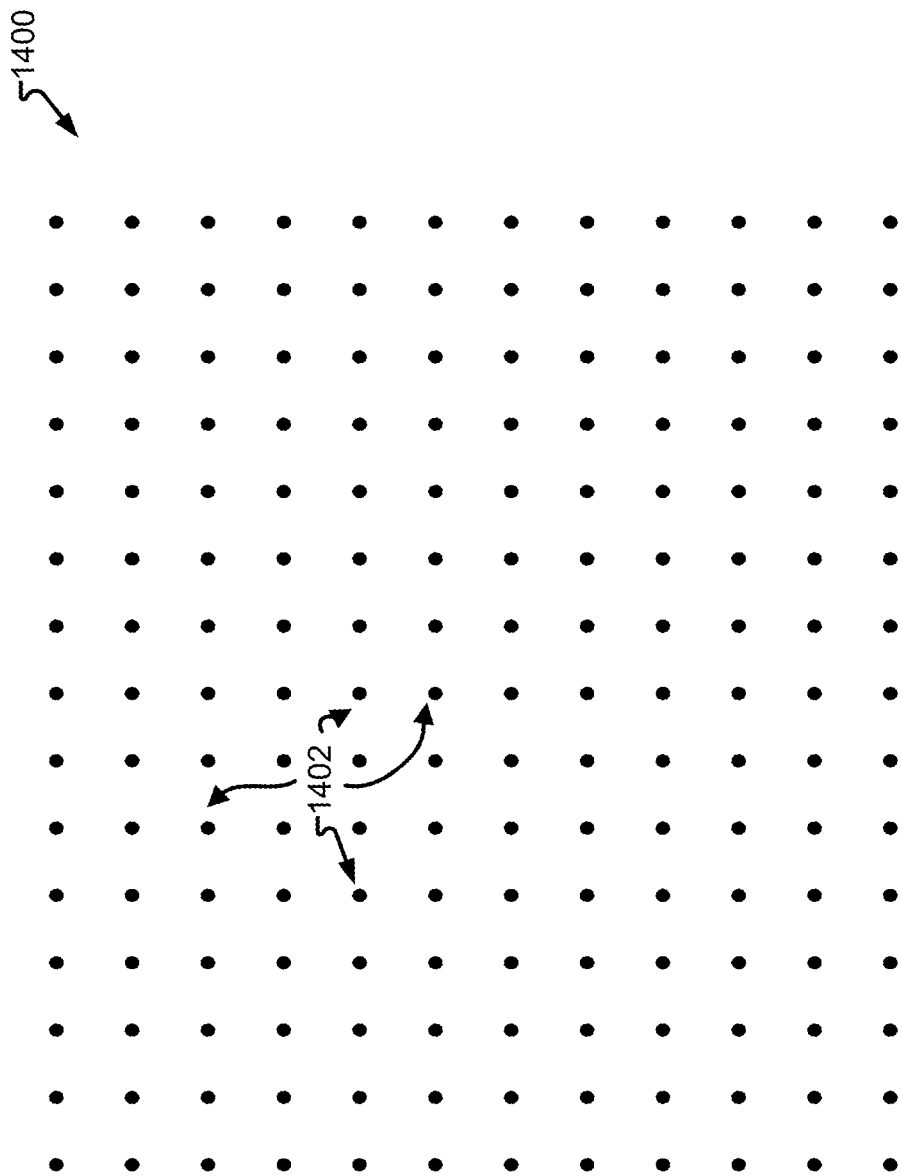

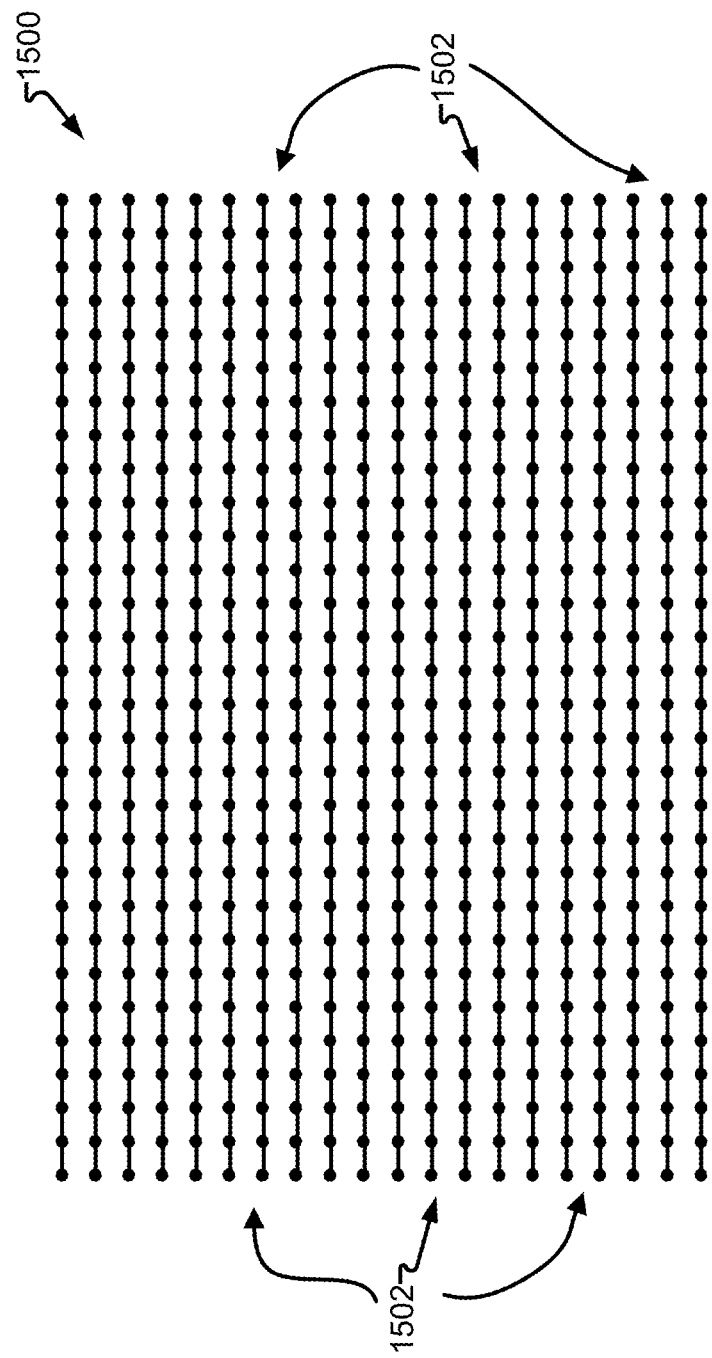

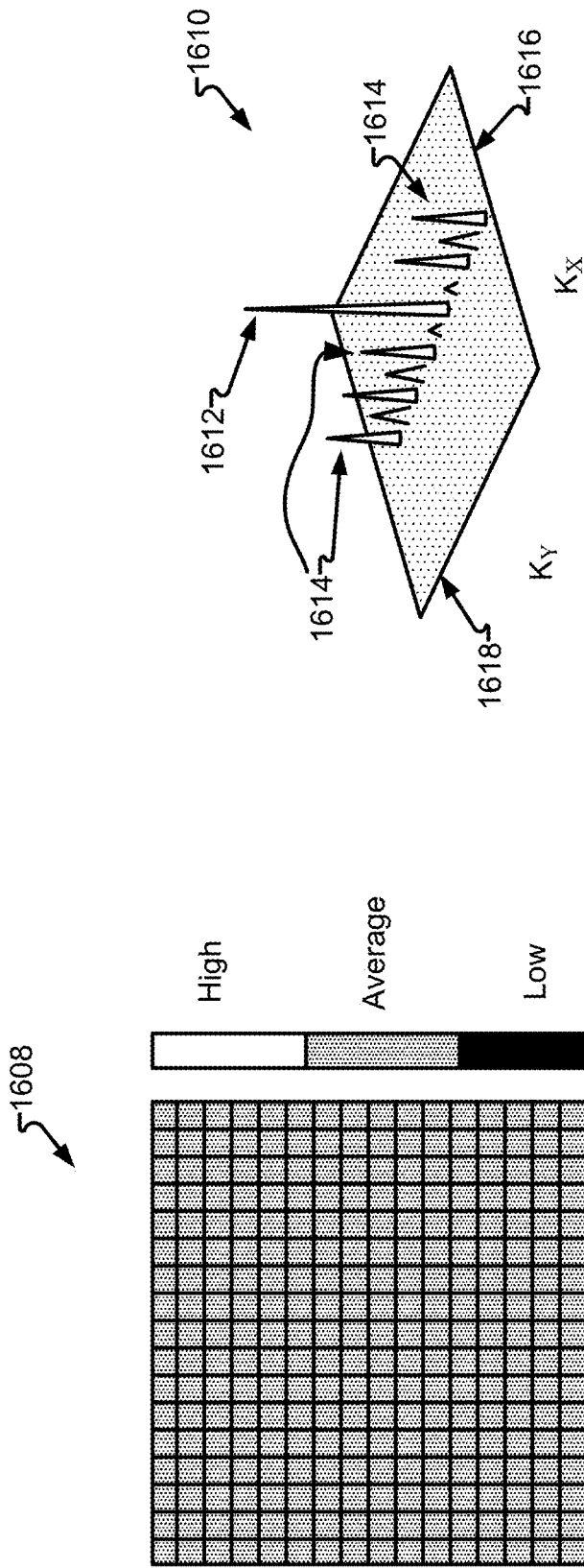

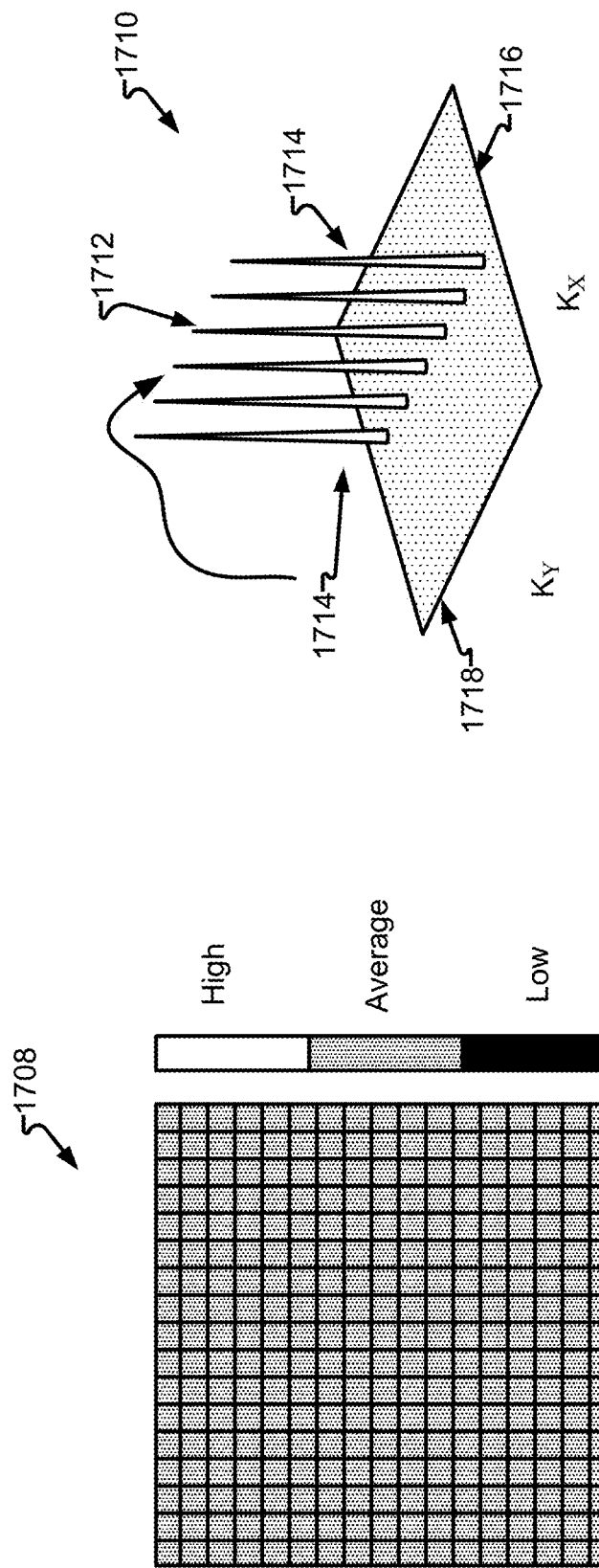

ERGODIC GEOPHYSICAL DATA ACQUISITION DESIGN

CROSS-REFERENCE TO RELATED APPLICATIONS

The present application claims the benefit of Provisional Patent Application No. 63/227,736 filed on Jul. 30, 2021, and is incorporated herein by reference in its entirety.

FIELD OF THE DISCLOSURE

The invention relates generally to systems and methods for acquiring geophysical data on the earth's surface and particularly to efficiently determining a number of locations to gather the information about the subsurface.

BACKGROUND

Data collections play a critically important role in the current data-driven world. However, data collections can be extremely expensive in some fields, such as in oil and gas industries, mineral industries, ground water exploration and management, and carbon capture utilization and storage (CCUS) monitoring. Geophysical data applied in these fields are costly, and the cost of collecting geophysical data can be so high that it may hinder the effective application of geophysical methods in the solution in these afore-listed fields. The primary factor that increases the cost of geophysical acquisition is the large number of spatial sampling locations (herein "locations") commonly distributed uniformly as dictated by Nyquist sampling.

While Nyquist sampling, is one technique used to determine a regular pattern. Other techniques, such as random sampling provides an irregular pattern.

SUMMARY

Regular patterns and random patterns each provide certain benefits, however, it is often more desirable to determine an optimized irregular pattern. Seeking optimized irregular patterns remove unnecessary or redundant samples while achieving the necessary condition to gather the desired information with the fewest number of locations. Some recent approaches for optimizing sampling patterns use only the characteristics between adjacent sample pairs and others only use a quantity called "mutual coherence."

Due to the time, expense, and resource requirements to gather data, there is an ever present need to reduce the number of locations but still maintaining a sufficient number of locations to obtain an accurate assessment of the target area. While the Nyquist sampling theorem dictates a sufficient number of sensors, it does not determine an ideal number.

However, the foregoing methods fail to determine the optimal irregular pattern. These and other needs are addressed by the various embodiments and configurations of the present invention. The present invention can provide a number of advantages depending on the particular configuration. These and other advantages will be apparent from the disclosure of the invention(s) contained herein.

As a general introduction, and in one embodiment, ergodic sampling it utilized to capture the same amount of information with a fraction of the number of samples of uniform dense grid. Ergodic sampling provides improvements in modeling, with fewer sensors for a given area when compared to the number and methodology specified by prior art modeling techniques (e.g., Shannon-Nyquist sampling theory).

Ergodic sampling is based, at least in part, on ergodicity, which is a property of a system wherein a sufficient subset of samples can represent the average properties of an entire system, as a whole, including ordinary randomness.

In one embodiment, one or more of four different attributes (described below) are used to characterize the sampling pattern and achieves an overall optimality.

In another embodiment, all sample pairs are used rather than adjacent sample pairs, and applies four attributes including interval distribution, angle distribution, density function, and spectral resolution function to find the optimized irregular pattern, which we refer to herein as the ergodic sampling pattern. Ergodic sampling provides many benefits, including: (1) resource savings by only using a small subset of uniform dense samples. In this manner, the ergodic pattern can significantly reduce the number of sensors or stations and achieve resource savings; and (2) increasing information, which shifts from the regular pattern to ergodic pattern while maintaining the same number of locations. As a benefit, more information can be collected by using the same number of locations or the same budget.

As described herein, embodiments utilize ergodic sampling which is then applied to provide efficient spatial data collections.

Embodiments of ergodic sampling utilize one or more of five aspects: general ergodic equations, ergodic patterns, ergodic attributes, ergodic optimization, and ergodic templates. Ergodic attributes include one or more of: (a) interval distribution of all sample pairs, (b) angle distribution of all sample pairs, (c) sample density function, and (d) spectral resolution function. Ergodic templates include: (a) low-resource ergodic template and/or (b) high-resolution ergodic template.

Ergodic sampling utilizes at least four efficient acquisition design criteria to design specific receiver-deployment patterns using a fraction (10%-50%) of the receiver stations otherwise required by traditional means, such as Shannon-Nyquist sampling. Data acquisition may be performed utilizing a fixed number of sensors to obtain data from a larger area or a reduced number of sensors for a fixed area. Thus, the ergodic sampling described in the embodiments herein can lead to a significant reduction in the resources associated with data acquisition.

Embodiments herein may be utilized for geophysical data acquisition of electromagnetic, magnetic, DC resistivity and induced polarization, gravity, gravity gradiometry, DAS, and seismic data, and in the design of drilling programs and in ore reserve estimation. Data may be acquired from a number of sensors. Geophysical sensors (or, more simply, "sensors") are variously embodied and gather information and report that information via a network (wired or wireless) connection or storage and subsequent retrieval of the data from the storage. Sensors may be seismic, gravity, magnetic, electric, electromechanical, borehole, and/or other form of data gathering device specific to a location. While embodiments herein are primarily directed to sensing subsurface attributes, sensors may comprise or utilize devices to generate signals (e.g., inductive electromagnetic transmitters, grounded electromagnetic transmitters, grounded electrical sources, vibroseis trucks, explosions, seismic air guns, etc.) for observing. One sensor may collect data from a plurality of locations (e.g., airborne, watercraft, submarine, surface vehicle, man-portable, etc.). In other embodiments, a plurality of sensors are utilized to collect data concurrently or substantially concurrently. For example, the data obtained from one sensor may be combined with data obtained from other sensors, including the timing of when a particular signal was received, such as to determine subtle differences in when a signal is observed by which sensor at a particular location.

Exemplary aspects are directed to systems, methods, and devices to perform: determining a surface area overlaying the subsurface volume; calculating an ergodic pattern comprising a set of locations on the surface area; obtaining observed data from the surface area at each of the set of locations; and determining, from the observed data, the property of the subsurface volume.

Additional aspects include:

A method of determining a property of a subsurface volume, comprising: determining a surface area overlaying the subsurface volume; calculating an ergodic pattern comprising a set of locations on the surface area; obtaining observed data from the subsurface volume at each of the set of locations; and determining, from the observed data, the property of the subsurface volume;

A system for determining a property of a subsurface volume, comprising: at least one microprocessor coupled with a computer memory comprising computer readable instructions; and wherein the at least one microprocessor performs: determining a surface area overlaying the subsurface volume; calculating an ergodic pattern comprising a set of locations on the surface area; obtaining observed data from the subsurface volume at each of the set of locations; and determining, from the observed data, the property of the subsurface volume;

A system for determining a property of a subsurface volume, comprising: means to determine a surface area overlaying the subsurface volume; means to calculate an ergodic pattern comprising a set of locations on the surface area; means to obtain observed data from the subsurface volume at each of the set of locations; and means to determine, from the observed data, the property of the subsurface volume.

Any one or more of the foregoing aspects:

wherein the set of locations consist of locations calculated solely by the ergodic pattern and omit any location not determined by the ergodic pattern.

wherein calculating the ergodic pattern comprises, selecting the set of locations in accordance with the equation:

$$\Phi^* = \mathrm{argmax}_\Phi \omega_\alpha S(\alpha_\Phi, \alpha_\theta) + \omega_\beta S(\beta_\Phi, \beta_\theta) + \omega_\gamma S(\gamma_\Phi, \gamma_\theta) + \mu_\Phi S(\xi_\Phi, 0)$$

wherein:
$\Phi^*$=Ergodic pattern;
$\Phi$=Irregular pattern;
$\Theta$=Dense regular grid;
S=Similarity function which is selected from one of entropy, cross-correlation, L1 norm, and L2 norm;
$\omega_\alpha$, $\omega_\beta$, $\omega_\gamma$=weights;
$\alpha$=Interval distribution of all sample pairs;
$\beta$=Angle distribution of all sample pairs;
$\gamma$=Sample density function;
$\xi$=Parameter from spectral resolution function (SRF);
$\mu$=Parameter spectral resolution function (SRF); and
$\delta$=Sample percentage.

Wherein obtaining the observed data from the subsurface volume at each of the set of locations comprises deploying a plurality of sensors at a corresponding plurality of the locations and receiving the observed data from each of the plurality of sensors substantially concurrently.

Wherein obtaining the observed data from the subsurface volume at each of the set of locations comprises deploying a sensor sequentially to traverse each of a plurality of the locations and receiving a portion of the observed data from the sensor when located at each of the plurality of the locations.

Comprising traversing the sensor on the surface and automatically obtaining the portion of the observed data from the sensor upon the sensor being located at one of the plurality of locations.

Wherein the surface area comprises a surface of a fluid layer.

Wherein the surface area comprises at least a portion of the fluid layer above the subsurface volume.

Wherein the surface area comprises at least one of a body of water and a gaseous atmosphere.

Further comprising: repeating the ergodic pattern onto a subsequent surface area; obtaining subsequent observed data from a subsequent subsurface volume at each of the set of locations overlaying the subsequent surface area; and determining, from the subsequent observed data, a property of the subsequent subsurface volume.

Wherein the set of locations comprise a set of points.

Wherein the set of locations comprises a set of parallel tracks and wherein the ergodic pattern determines the distance between the set of parallel tracks.

A system on a chip (SoC) including any one or more of the above aspects or embodiments of the embodiments described herein.

One or more means for performing any one or more of the above aspects or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above aspects, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures:

FIGS. 13A, 13B, 13C, 13D, 13E, and 13F depicts a dense regularly spaced location configuration in accordance with embodiments of the present disclosure;

FIGS. 14A, 14B, 14C, 14D, 14E, and 14F depicts a sparse regularly spaced location configuration process in accordance with embodiments of the present disclosure;

FIGS. 15A, 15B, 15C, 15D, 15E, and 15F depicts a dense regularly spaced line location configuration in accordance with embodiments of the present disclosure;

FIGS. 16A, 16B, 16C, 16D, 16E, and 16F depicts an ergodic spaced line location configuration process in accordance with embodiments of the present disclosure;

FIGS. 17A, 17B, 17C, 17D, 17E, and 17F depicts sparse regularly spaced line location configuration in accordance with embodiments of the present disclosure;

DETAILED DESCRIPTION

Figure 1:
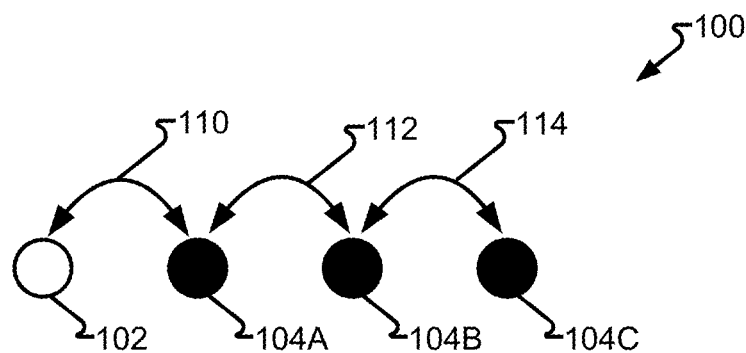
FIG. 1 depicts a graph of locations in accordance with the prior art.

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with the like reference number. When such a reference is made in the singular form, but without identification of the sub-reference identifier, it is a reference to one of the like numbered elements, but without limitation as to the particular one of the elements being referenced. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

In another embodiment, an ergodic general equation is disclosed (equation 1), wherein:

$$\Phi^* = \mathrm{argmax}_{\Phi} \omega_\alpha S(\alpha_\Phi, \alpha_\theta) + \omega_\beta S(\beta_\Phi, \beta_\theta) + \omega_\gamma S(\gamma_\Phi, \gamma_\theta) + \mu_\Phi S(\xi_\Phi, 0) \quad (1)$$

Wherein:
$\Phi^*$(Phi*)=Ergodic pattern produced;
$\Phi$ (Phi)=Irregular pattern;
$\Theta$ (Theta)=Dense regular grid;
S=Similarity function which is selected from one of: entropy, cross-correlation, L1 norm, and L2 norm;
$\omega_\alpha$, $\omega_\beta$, $\omega_\gamma$ (lower case omega sub alpha, sub beta, sub gamma)=weights;
$\alpha$ (lower case Alpha)=Interval distribution of all sample pairs;
$\beta$ (lower case Beta)=Angle distribution of all sample pairs;
$\gamma$ (lower case Gamma)=Sample density function;
$\xi$ (lower case Xi)=Background fluctuations in the spectral resolution function (SRF);
$\mu$ (lower case Mu)=Ratio of the amplitudes of largest peak over the amplitude of the next smaller peak in the spectral resolution function (SRF); and
$\delta$ (lower case Delta)=Sample percentage expressed as a fraction of the number of samples in the desired dense sampling grid.

Embodiments of the variables of Equation 1 include:
$\alpha_\Theta$, $\beta_\Theta$, and $\gamma_\Theta$, which are computed from the dense regular grid over which the data would be acquired. A dense grid is a group of points that are aligned along lines to two orthogonal directions and are placed at equal distance apart from adjacent points (an analogy is the pixels in a digital photographic image). $\omega_\alpha$, $\omega_\beta$, $\omega_\gamma$ are preferably set to the value of 1.0 (but can be set to values between 0.001 to 1000). A value between 0.1 to 0.9 is provided for the parameter $\delta$, corresponding to 10% to 50% of the samples in the dense grid to be used in the ergodic pattern. These input parameters and functions are fixed during the ergodic optimization, while $\alpha_\Phi$, $\beta_\Phi$, $\gamma_\Phi$, and, $\xi_\Phi$ are computed for each trial sampling pattern $\Phi$ having the same number of samples specified by $\delta$. The quantity $\mu$ and function $\xi$ care computed from the spectral resolution function of the trial pattern $\Phi$.

Figure 3B:
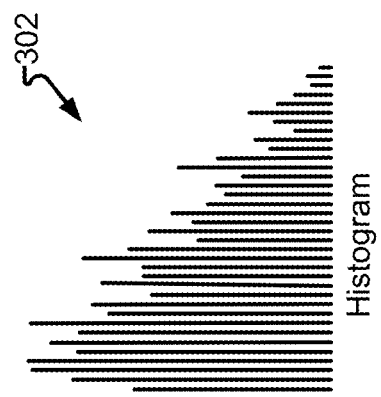
FIGS. 3A, 3B, 3C, 3D, and 3E depict graphs of ergodic locations in a linear configuration in accordance with embodiments of the present disclosure.
Figure 3A:
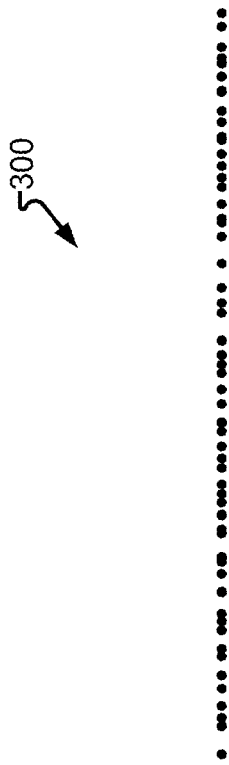

$\Phi^*$=an ergodic pattern, such as the 1-dimensional pattern of FIG. 3A and the 2-dimensional pattern of 4A.

$\Phi$=Irregular distribution determined by computing the distances (i.e., intervals) between all possible pairs of sampling points in a given pattern, either dense regular or irregular, and form a histogram of the occurrences of different intervals.

$\Theta$=Dense regular grid, such as a uniform spacing of a number of points, is determined by the common geophysics standards by current art that requires the spacing to be less than that required by the highest frequency content of the signal. A grid by definition must have more than one point but fewer than infinity. For example, a regular grid for a mineral exploration data acquisition can be at least 10×10 point with the spacing between points ranging from 1 m to 1000 m for most applications.

S=Similarity function which is selected from one of: entropy, cross-correlation, L1 norm, and L2 norm;

Definition of similarity function given in example of $\alpha$, while the equation 1 holds true when replaced with other function $$\mathrm{Entropy:Entropy} = -\sum [|\alpha_\Phi - \alpha_\theta| \times \ln(|\alpha_\Phi - \alpha_\theta|)] \quad (2)$$

L1−norm:sum of the absolute value of the difference (3)
between the two functions $$\|\alpha_\Phi - \alpha_\theta\|_1 = \sum |\alpha_\Phi - \alpha_\theta|$$

L2−norm:Euclidean norm of the difference between the (4)
two functions $$\|\alpha_\Phi - \alpha_\theta\|_2 = \left(\sum |\alpha_\Phi - \alpha_\theta|^2\right)^{1/2}$$

Cross−correlation between two functions $\alpha_\Phi$ and $\alpha_\theta$ (5)

$$\mathrm{Cross-correlation} = \frac{\sum \alpha_\Phi \times \alpha_\theta}{\sqrt{\sum \alpha_\Phi^2} \times \sqrt{\sum \alpha_\theta^2}}$$

The particular utilized for the similarity function (S) is variously embodied. In one embodiment, entropy is used (Equation 2). In another embodiment, cross-correlation (Equation 5) is utilized, such as when the percentage of $\delta$ is small than 25%. In another embodiment, L1-norm (Equation 3) it utilized to control the maximum error calculation. In another embodiment, L2-norm (Equation 4) is utilized to control the average error of calculation.

$\omega_\alpha$, $\omega_\beta$, $\omega_\gamma$, are specified to be between 0.00 and 1000. In one embodiment used most commonly, $\omega_\alpha = \omega_\beta = \omega_\gamma = 1.0$, which gives the three spatial properties equal weight.

$\alpha$=Interval distribution of all sample pairs determined, in one embodiment, by a histogram of the distances between location pairs (See FIGS. 13B, 14B, 15B, 16B, and 17B);

$\beta$=Angle distribution of all sample pairs determined, in one embodiment, by a histogram of the angles between location pairs (See FIGS. 13C, 14C, 15C, 16C, and 17C);

$\gamma$=Sample density function determined, in one embodiment, by the number of samples per average length or area. (See FIGS. 13D, 14D, 15D, 16D, and 17D);

$\xi$=Parameter from spectral resolution function (SRF) by collecting all the values in the SRF except the main peak.

$\mu$=Parameter of spectral resolution function (SRF) determined by taking the ratio of the second largest amplitude over the largest amplitude.

$\delta$=Sample percentage determined by the ratio of the sample number in the irregular grid over the dense regular grid. $\delta$ ranges between 0.1 and 0.9.

As referenced above, the singularity function ("S") similarity selected may be entropy as a general option, cross-correlation when the percentage of $\delta$ is less than 25%; L1-norm in order to control the maximum error calculation; and L2-norm to control the average error of calculation.

This ergodic objective function can be expanded with more attributes fitting for different type of signals, or more constraints because of sampling locations availability. For example, certain geophysical sensors or machines are deployed based on lines, which have to be added as the constraints, such as cables or paths of ships and aircraft. Such paths are not scattered points and the actual measurement points need to be constrained because their path is based on a line shape.

In one embodiment, the placement of sensing equipment is determined. The placement, such as on a previously determined area of Earth, of the sensing equipment obtains subsurface information via transmission and reception or reception only (transmission of a signal to be sensed originates from a different source) of seismic, electromechanical, gravitational, magnetic, compositional, or other feature indicative of the presence of one or more target resources. The sensing equipment is variously embodied and may include calibrated timing equipment to precisely measure the occurrence of an event (e.g., a seismic wave). Accordingly, the sensing equipment may have an interface to a network, processor, computer memory accessible to the processor, data storage (e.g., storing data), and/or other computing/networking components.

The sensing equipment may be placed on the ground, at least partially in-ground (e.g., drilled, pressed, hammered, etc.) such as to engage soil more conducive to the detection of a particular signal for which the sensor is configured that would be more difficult to detect via surface contact alone. Such sensors may conduct sequential or simultaneous observations, such as observing a seismic wave. In other embodiments, a smaller number of sensors, which may include a single sensor is sequentially moved from location to location to conduct observations thereon. In such embodiments, the sensing equipment may be manually placed or automatically placed via surface vehicle, boat, aircraft, or other means of locomotion. Automatic placement may include computer guided navigation, automatic navigation (e.g., autonomously navigated watercraft, aircraft, or surface vehicles).

A particular location may or may not be available. For example, a lake may not be suitable for certain equipment used to detect particular signals and, therefore, be unavailable. However, a plane can flight over the lake to detect magnetic signal, in this case, the lake is available. Steep terrain or legal inaccessibility may similarly prevent the placement of sensing equipment at a particular location.

FIG. 1 depicts graph 100 comprising point 102 and points 104A-104C. Point 102 and points 104A-104C identify a physical location above a surface. In one embodiment, each of point 102 and 104A-C represent physical locations where a sensor has been or will be placed to collect data specific to that particular location. Distance 110, between point 102 and 104A is the same, or substantially the same, as distance 112 between points 104A and 104B and distance 114 is the same, or substantially the same, as the distance.

Point 102 illustrates one particular location wherein knowledge of distance 110 causes all locations (e.g., distances 112 and 114) to be known. As a practical matter, distances 110, 112, and 114 vary such as due to terrain limitations, accuracy of locating and/or sensor placement equipment, etc. However, distances 110, 112, and 114 are the same or substantially so, when their location on surface (or airborne) is sufficiently precise to obtain the desired information for the corresponding subsurface volume. Simply put, if the data gathered by a sensor at an actual location (e.g., identified by one of point 102, 104A-104C) is reasonably known to be the same or inconsequentially different from the data that would have been gathered had the sensor been placed exactly at the desired location, then the sensor may be considered to be at the desired location and, therefore, to have a distance to a neighboring location that is considered to be the desired distance (e.g., distance 110, 112, and 114).

Figure 2:
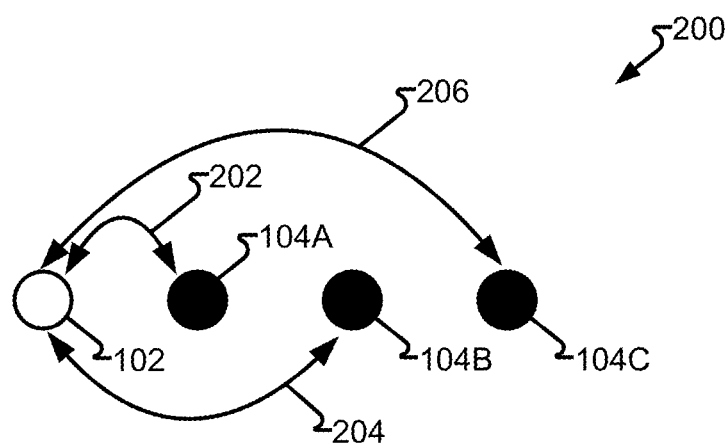
FIG. 2 depicts a graph of locations in accordance with embodiments of the present disclosure.

FIG. 2 depicts graph 200 comprising point 102 and neighboring points 104A-104C. Graph 200, which is not to scale, depicts point 102 having distance 202 to point 104A, distance 204 to point 104B, and distance 206 to point 104C. It should be appreciated that the distances between any two or more of point 102 and points 104A-104C may differ from each other beyond the uniform (or substantially so) distances of illustrated in FIG. 1. More specifically, distances 202, 204, and 206 vary to place points 102, 104A-104C ergodically along a line.

Knowing and/or determining the distance between each pair of points is utilized to ergodically place locations. As one example, the location between point 102 and each of points 104A, 104B, and 104C are determined as distances 202, 204, and 206, respectively. In another embodiment, another location (such as location identified by point 104A) is utilized (designated by point 102) and distances to each other location determined. As a result, all distances between each location pair are known, such as when verifying locations represented by points 102, and 104A-C are ergodic, or determined where points 102 and 104A-104C should be in order to be ergodic.

As will be described more completely with respect to the embodiments that follow, linear (i.e., one-dimensional) configurations (e.g., graph 100 and graph 200) may, in other embodiments, be expanded to a two-dimensional configuration (e.g., a grid, plane, etc.) wherein the spacing of points along an orthogonal axis is uniform (similar to graph 100) or ergodic (similar to graph 200). Similarly, and in another embodiment, a three-dimensional configuration whether regular (e.g., cube) or irregular.

In another embodiment, the determination of an ergodic set of locations for sensing exclusively and omits any location not determined by the ergodic pattern or necessary to satisfy the ergodic criteria.

Figure 3D:
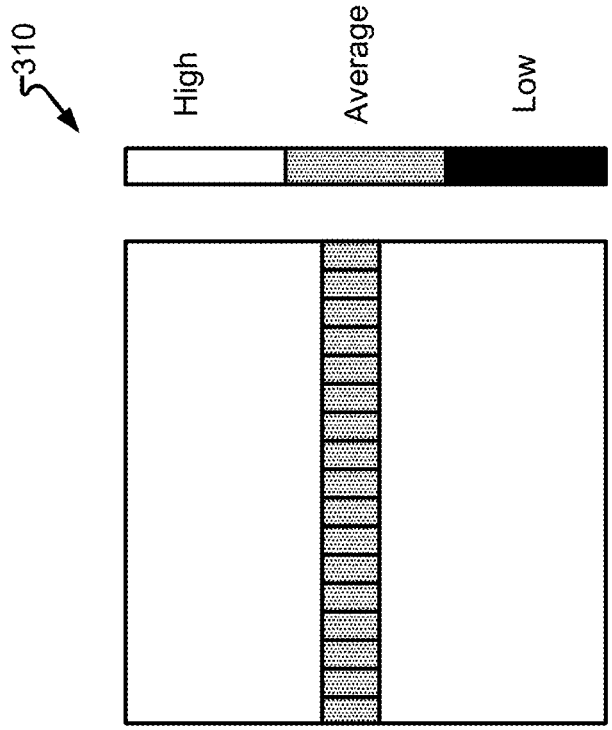
Figure 3C:
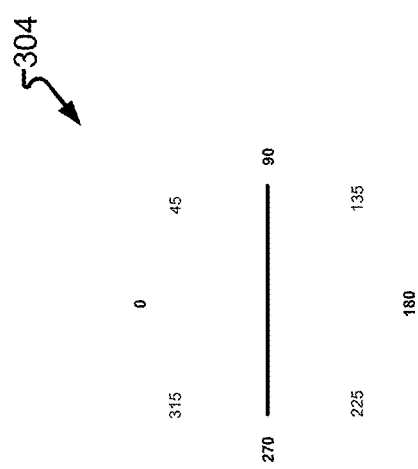

FIGS. 3A-3C depicts graph 300 and attributes thereof in accordance with embodiments of the present disclosure. In one embodiment, graph 300 (FIG. 3A) illustrates a linear configuration of ergodic points that represent physical locations on a surface. FIG. 3B illustrates histogram 302 illustrating the distances between any two points in graph 300, wherein most points are relatively close to another point (e.g., the larger bars on the left portion of graph 300) and, somewhat linearly, few points have greater distances to other points until the far-right-most point and the far-left-most point on graph 300 are the points that have the greatest distance therebetween.

FIG. 3C illustrates diagram of angles 304 between each pair of points in graph 300. As graph 300 illustrates points in a linear configuration, the angles therebetween are similarly linear (e.g., 270 degrees or 90 degrees).

FIG. 3D depicts sample density function, which illustrates that the distribution of points are within an average area.

Figure 3E:
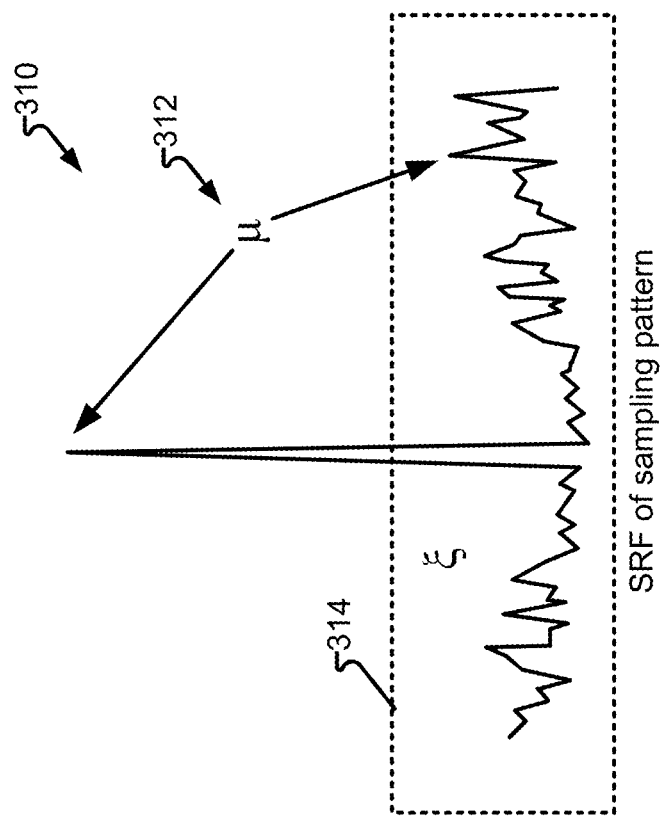

FIG. 3E depicts graph 310 comprising an example of SRF in 1D. SRF indicates the amount of detail are leaked from the main peak when a sparse irregular pattern is used, such the data sensed by equipment placed on the irregular sampling pattern. The two amplitudes that define the parameter "μ", and all amplitudes except the highest one that form the "ξ".

312 depicts the two amplitudes that define μ.

314 depicts the amplitudes inside the dashed box that form ξ.

FIGS. 4A-4F depict graph 400 and attributes thereof in accordance with embodiments of the present disclosure. In one embodiment, graph 400 (FIG. 4A) illustrates a two-dimensional plane comprising ergodic points (e.g., locations). It should be appreciated that graph 400 may illustrate real-world surfaces having a variation in height orthogonal to the plane illustrated by graph 400 and the points therein have variations along a z-axis (not shown). In such embodiments, graph 400 illustrates a plan view wherein height differences may be present but not illustrated. As introduced above, and in another embodiment, the embodiments herein may be expanded into a three-dimensional space.

Histogram 402 (FIG. 4B) illustrates the distances between points wherein a few points are relatively close to another point (e.g., the bars on the left portion of graph 400) and a few points of graph 400 have distances at the far-left-most portion of graph 400, such as the points that are at diagonal extremes on graph 400. Most points have distances clustered in the middle of histogram 402.

Graph 404 (FIG. 4C) illustrates the angles between any two points of graph 400. Graph 402 illustrates that the ergodic pattern of graph 400, while not uniform in there spacing or angles therebetween, produces a substantially uniform distribution of angles between pairs of points.

Graph 406 (FIG. 4D) illustrates that the distribution of points in graph 400 are within an average area.

Figure 4B:
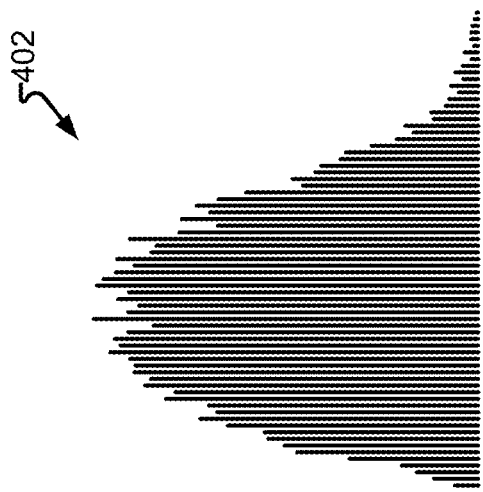
FIGS. 4A, 4B, 4C, 4D, 4E, and 4F depict graphs of ergodic locations in a two-dimensional configuration in accordance with embodiments of the present disclosure.
Figure 4A:
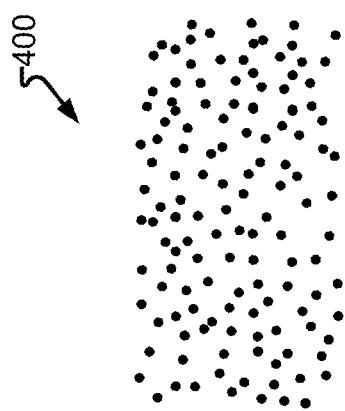
Figure 4D:
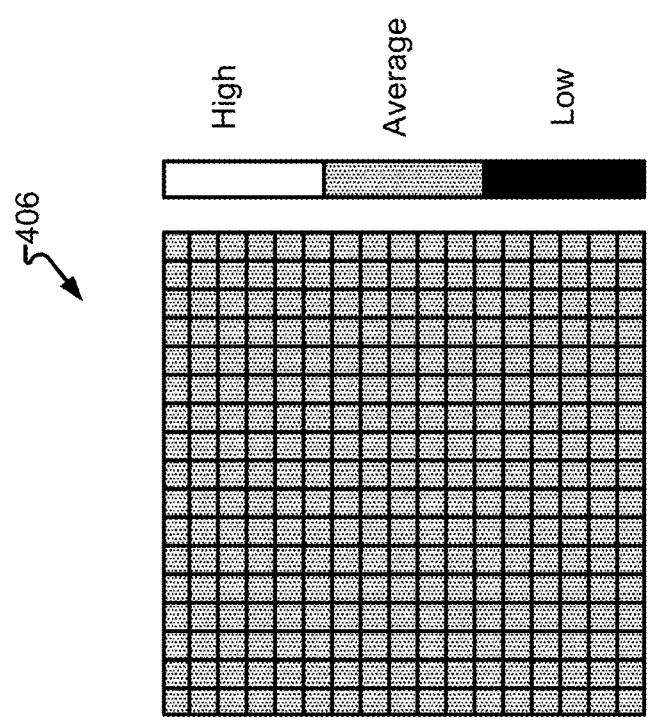
Figure 4C:
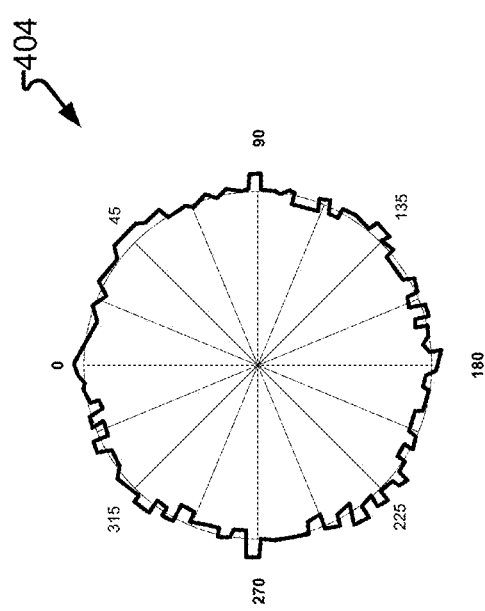
Figure 4E:
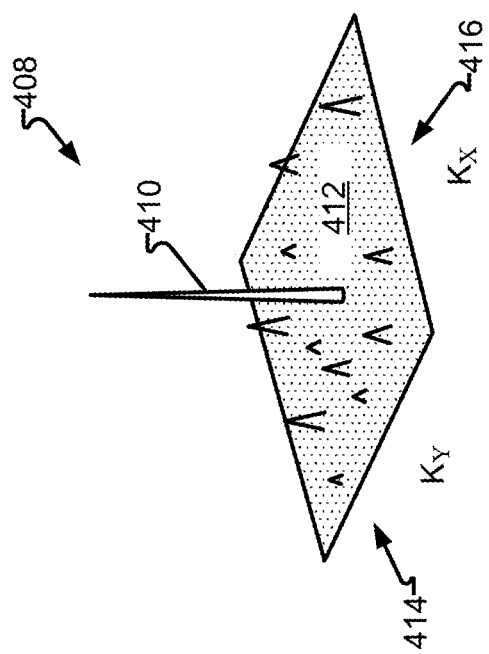

FIG. 4E depicts SRF sampling pattern 408 of graph 400 in accordance with embodiments of the present disclosure. Graph 400 plots data on a two-dimensional surface, corresponding to graph 400, along axis 416 ($K_X$) and axis 414 ($K_Y$).

410 depicts the highest peak or the main peak, which is a representation of the single amplitude if a signal to be sampled contains this single frequency component.

412 depicts the background fluctuations in the 2D SRF. These fluctuations are the 2D equivalent of those fluctuations inside the dashed rectangle in the 1D case.

Figure 4F:

FIG. 4F depicts image 418 of a surface. Image 418 having a particular resolution determined by placement of sensors at the points of graph 400 and obtaining imaging data therefrom.

Figure 5:
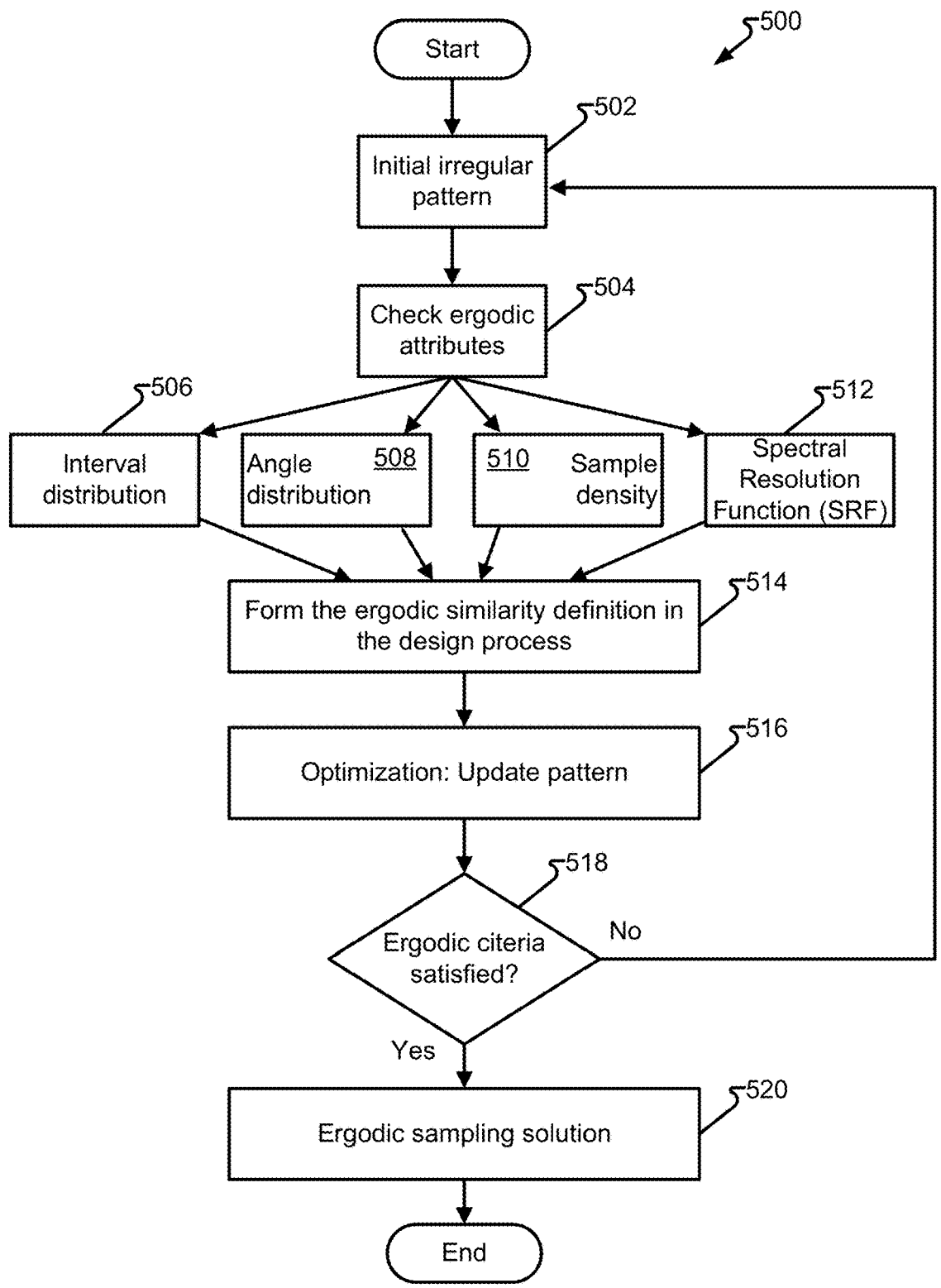
FIG. 5 depicts a process in accordance with embodiments of the present disclosure.

FIG. 5 depicts process 500 in accordance with embodiments of the present disclosure. In one embodiment, process 500 is embodied as machine-readable instructions maintained in a non-transitory memory that when read by a machine, such as a microprocessor(s), cause the machine to perform the steps of process 500.

Process 500 begins and, at step 502, an irregular pattern of points is selected. The number of points within the irregular pattern being determined by an available number of corresponding sensing components and/or ability to obtain data from sensing component(s). For example, a single sensing observation will obtain data from a number of points that will be no more than, and preferably equal to, the number of sensing components available for use during the sensing observation. If the sensing component(s) will be relocated for use over a number of sensing observations, then the number of points in the irregular pattern will be no more than, and preferably equal to, the number of sensing observations available to be made.

The selection of a particular irregular pattern performed in step 502 may be the selection of a previously or newly generated random pattern or a previously utilized irregular pattern. An irregular pattern is a subset of a regular pattern and only has so grid points "active" and others missing. It is said to be irregular because these point have different distances between adjacent pairs and do not appear to be on a regular grid.

Step 504 evaluates the attributes, comprising steps 506-512, of irregular pattern (from step 502) for subsequent use in step 514.

Attributes evaluation steps 506-512 evaluate the attributes therein against similar attributes for a regular distribution of points in one or more, and preferably each of, steps 506, 508, 510, 512. More specifically, steps 506-512 evaluate the irregular pattern to determine the degree of match, between the attributes of the irregular pattern and the attributes of the dense grid so that the objective function in equation (1) is maximized. The 'match" is defined as having found the one irregular pattern whose attributes are closest to the dense grid as measured by the objective function in (1) has the value near 1. When a match occurs, distribution of distances between pairs of points against the distribution of distances between pairs of points for a regular distribution of points. If the degree of match is within a previously determined specified threshold, the irregular pattern has a distribution of points that matches the distribution of points for the dense grid.

Step 508 evaluates the irregular pattern of points to determine the degree of match, between the distribution of the angles between pairs of points against the distribution of the angle of pairs of points for a dense grid.

Step 510 evaluates the irregular pattern of points to determine the degree of match, between the distribution of the density of points against the distribution of the density of points for a dense grid.

Step 512 evaluates the irregular pattern of points to determine the degree of match, between the SRF of the irregular pattern of points against the SRF for the dense grid.

Step 514 form the objective function consisting of four terms in equation (1). So the attributes match of steps 506-512 are satisfied at the same time.

Step 516, evaluates the attributes therein against similar attributes for a dense grid in one or more, and preferably each of, steps 506, 508, 510, 512. More specifically, step 506-512 evaluates the irregular pattern to determine the degree of match between the attributes of the irregular pattern and the attributes of the dense grid so that the objective function in equation (1) is maximized to near value 1. The 'match" is defined as having found the one irregular pattern whose attributes are closest to the dense grid as measured by the objective function in (1) has the value near 1. When this occurs, the irregular pattern has a distribution of points that matches the distribution of points for the dense grid.

Test 518 determines if the ergodic criteria has been satisfied and, if determined in the negative, process 500 loops back to step 502 wherein a different irregular pattern is selected. If test 518 is determined in the affirmative, then processing continues to step 520 wherein the irregular pattern selected in step 502 (or a particular iteration thereof) as an ergodic solution.

Figure 6:
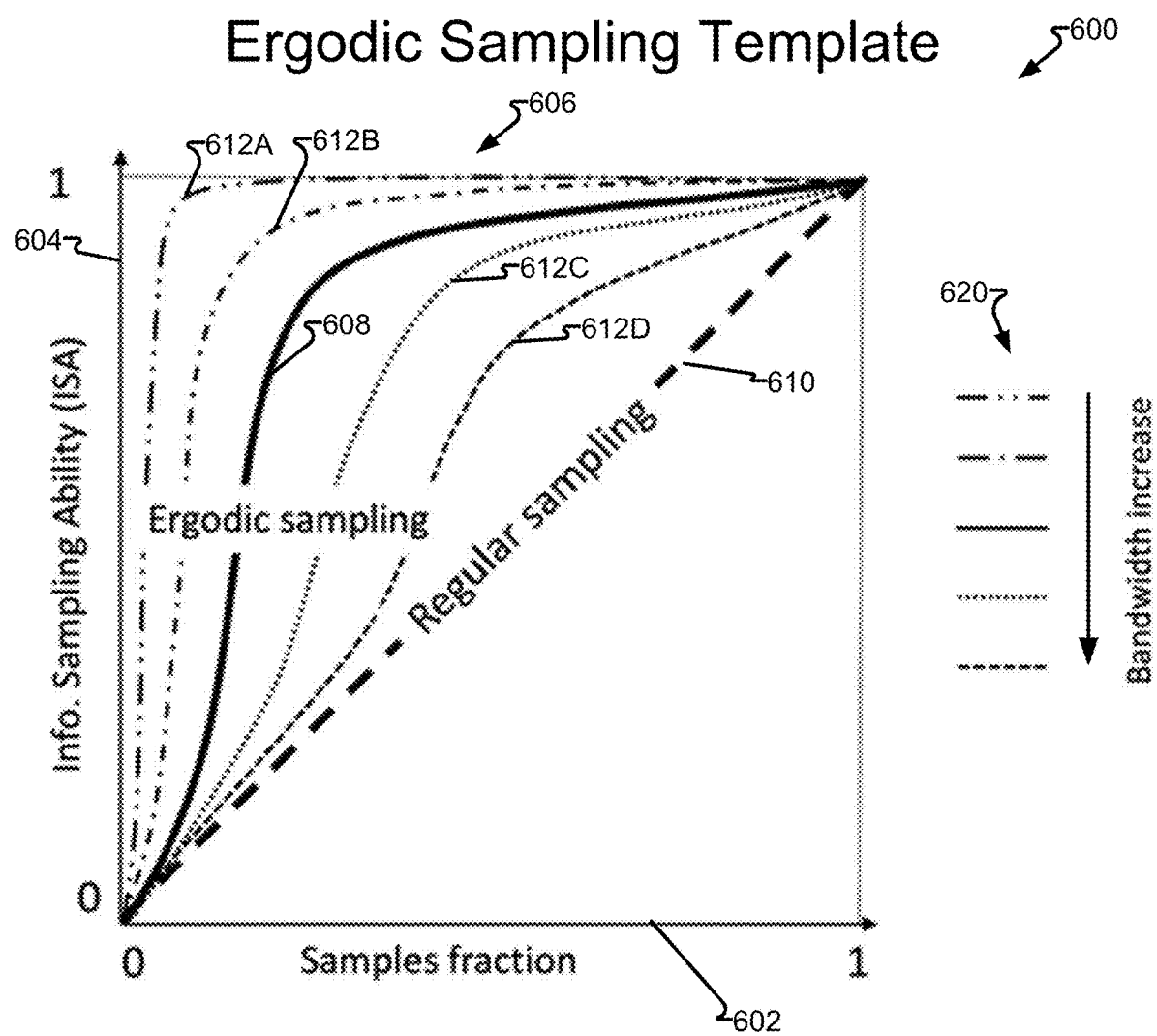
FIG. 6 depicts ergodic sampling template plots in accordance with embodiments of the present disclosure.

FIG. 6 depicts ergodic sampling plots 600 in accordance with embodiments of the present disclosure. In one embodiment, plots 600 comprises bandwidth plots 610 and 612A-612D along samples fraction axis 602 and information sampling ability (ISA) axis 604.

Samples fraction is delta ($\delta$), described more completely above.

Information sampling ability (ISA) denotes how well a sampling pattern can collect the information in the signal being sampled. ISA is defined as:

$$ISA(\Phi)=\omega_\alpha S(\alpha_\Phi,\alpha_\Theta)+\omega_\beta S(\beta_\Phi,\beta_\Theta)+\omega_\gamma S(\gamma_\Phi,\gamma_\Theta)+\mu_\Phi S(\xi_\Phi,0)$$

Key 620 illustrates the increase in bandwidth. The bandwidth is defined by the number of frequencies over the length of the signal. corresponding to plots 612A through 612D. Plot 610 illustrates the ISA for a regular sampling pattern.

Figure 7:
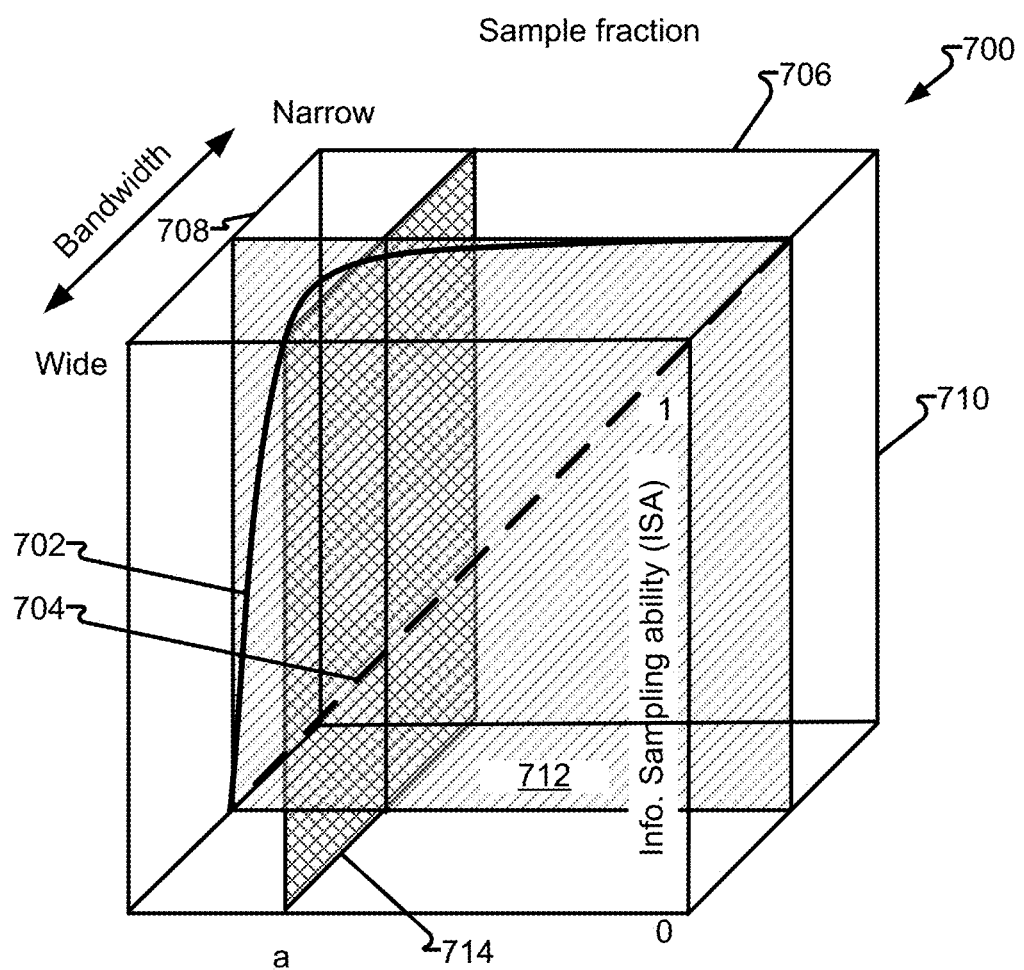
FIG. 7 depicts a graph in accordance with embodiments of the present disclosure.

FIG. 7 depicts graph 700 in accordance with embodiments of the present disclosure. In one embodiment, plot 702 illustrates a maximum number of sensing locations that can be saved with preserving a sufficiently high resolution.

Graph 700 comprises plot 702 within three axis. Sample fraction axis 706, bandwidth axis 708, and ISA axis 710. Sample fraction axis 706 is delta ($\delta$) described above. Bandwidth axis 708 is the average bandwidth of signal in the interested area, which is previously determined. ISA is information sampling ability defined earlier. Plane 712 is the relationship between ISA and sample fraction when the signal bandwidth is fixed. Plane 714 is the relationship between ISA and bandwidth of signal when sample fraction is fixed. The curve 702 is in plane 712, which is the relationship between ISA and sample fraction.

Figure 8:
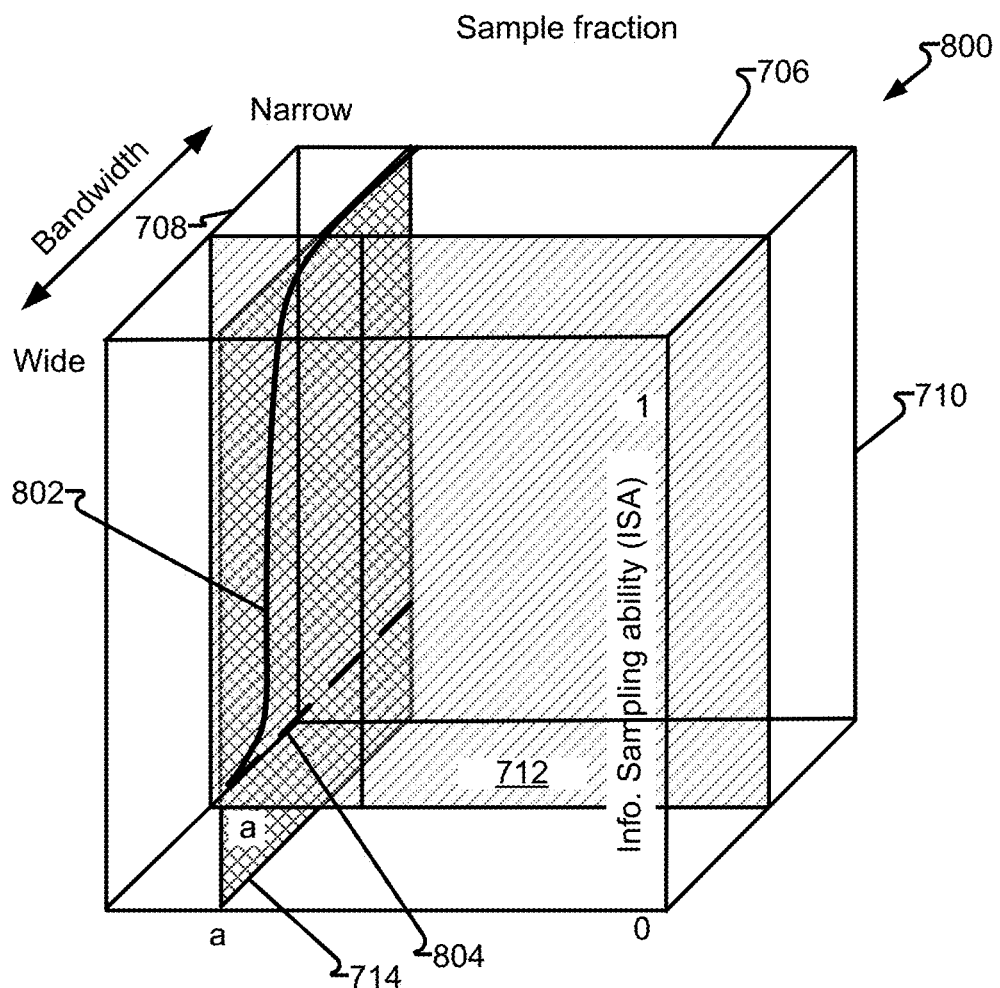
FIG. 8 depicts a graph in accordance with embodiments of the present disclosure.

FIG. 8 depicts a graph in accordance with embodiments of the present disclosure. In another embodiment, plot 802 illustrates the maintaining of a sufficiently high resolution for a particular class of signals to be sampled.

Figure 9:
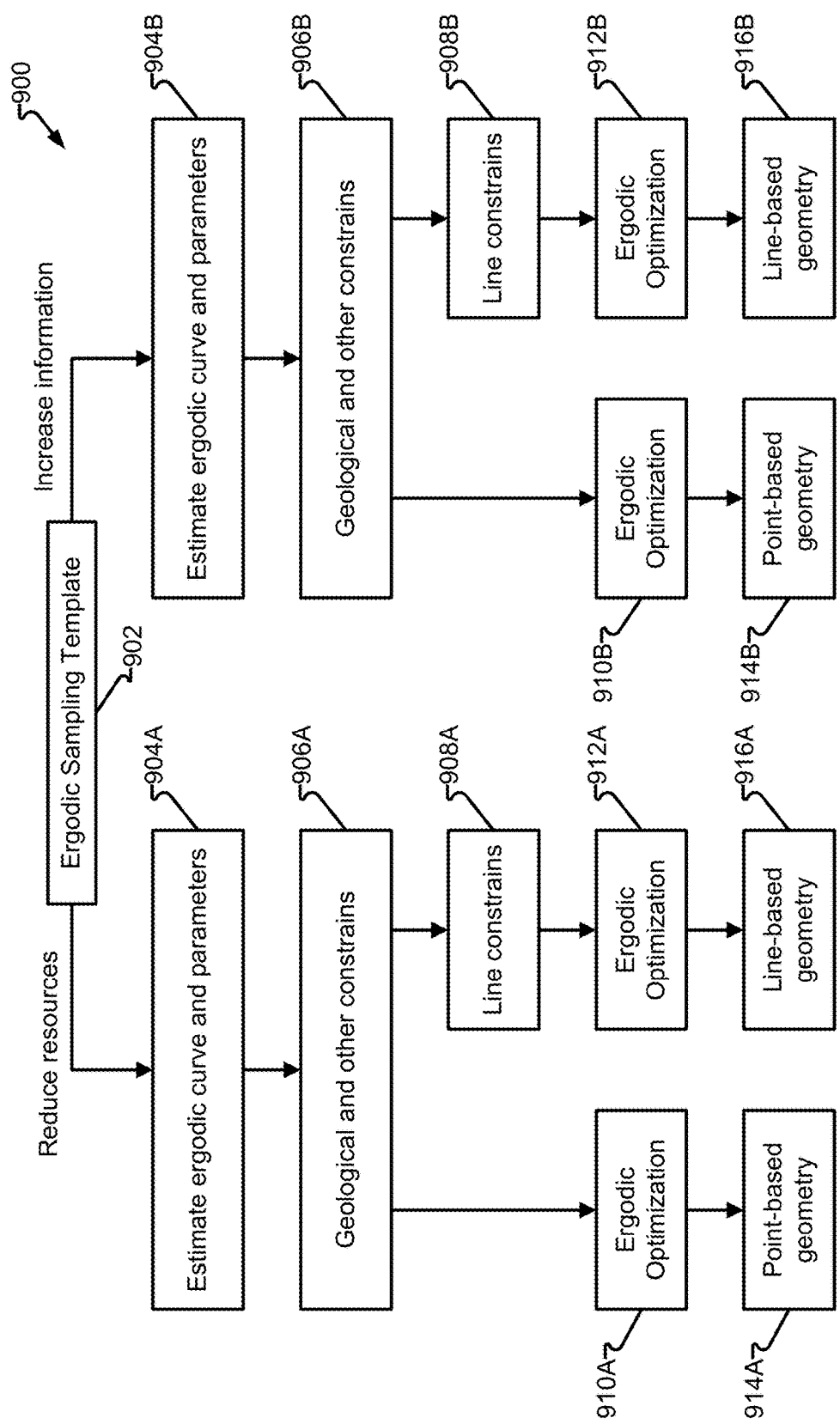
FIG. 9 depicts four use cases in accordance with embodiments of the present disclosure.

FIG. 9 graph 900 depicts use cases in accordance with embodiments of the present disclosure. In step 902, graph 900 considers whether the objective will be a reduction in resources, such as to reduce the number of sensors deployed or the number of sensing locations, or increase the information gathered, such as to deploy a fixed number of sensors or have a fixed number of sensing locations but obtain therefrom, more information, higher resolution information, or higher bandwidth information.

Next, depending on whether the left side of graph 900 (i.e., reduce resources) or the right side of graph 900 (i.e., increase information) is selected, a first path is selected comprising steps 904A, 906A, 908A, 910A, 912A, 914A, and 916A or a second path is selected comprising steps 904B, 906B, 908B, 910B, 912B 914B, and 916B, respectively.

The selected one of step 904A or 904B estimates an ergodic curve and parameters, further illustrated by graph 1000 (FIG. 10) or graph 1100 (FIG. 11), respectively.

The selected one of step 906A or 906B performs geological and other constraints, such as the condition some locations are inaccessible.

Following step 906A or 906B, the corresponding one of step 908A or 908B performs line constraints, which is required when the sensors must be in groups along lines such as airborne flight lines or sensor that are physically on a cable.

Following step 906A or 906B, the corresponding one of step 910A or 910B performs ergodic optimization, which carries out the mathematical optimization process to described o equation (1).

Following step 910A or 910B, the corresponding one of step 914A or 914B performs point-based geometry to produce a low-resource point-based geophysical data collection, when step 914A is executed. Similarly, 914B performs high-resolution point-based geophysical data collection, when step 914B is executed. Step 914A or 914B comprises the numerical optimization solution of equation (1).

Following step 908A or 908B, the corresponding one of step 912A or 912B performs ergodic optimization, which comprises the numerical optimization solution of equation (1).

Following step 912A or 912B, the corresponding one of step 916A or 916B performs line-based geometry to produce a low-resource line-based geophysical data collection, when step 914A is executed. Similarly, 914B performs high-resolution line-based geophysical data collection, when step 914B is executed. Step 914A or 914B comprises the numerical optimization solution of equation (1).

Figure 10:
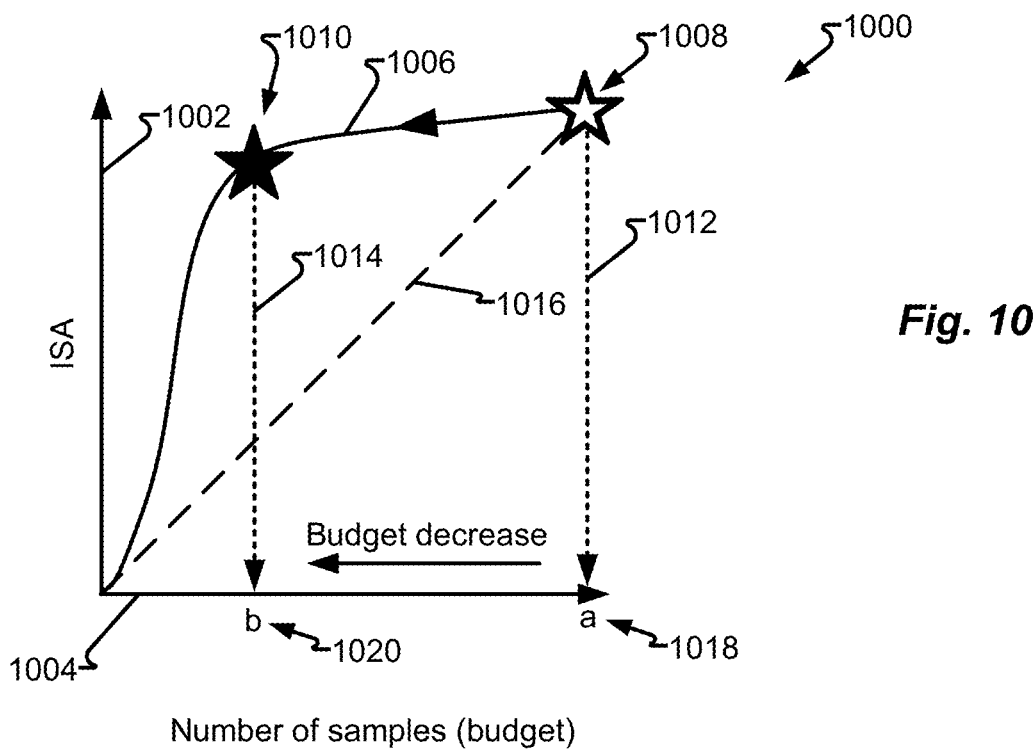
FIG. 10 depicts an optimization process in accordance with embodiments of the present disclosure.

FIG. 10 depicts optimization process 1000 in accordance with embodiments of the present disclosure. In one embodiment, process 1000 is, or comprises, step 904A (see FIG. 9). One benefit of ergodic sampling of an area is that the resolution of the data obtained does not decreases linearly with a reduction in the number of sensing locations between points 1008 and 1010. A regularly spaced grid or line of sensors produces a lower resolution of data, illustrated by line 1016, in direct proportion to the number of observations.

The number of observations may be determined by the number of sensors deployed or the number of sensing observations available. For example, equipment utilized to place and relocate sensors for subsequent observations may be only available for use for a certain period of time and each sensing observation requiring a substantially fixed portion of that time. By using ergodic sampling, a few number of observations may be utilized which, to a lessor degree, degrades the information received, as illustrated by curve 1006.

At point 1008, line 1012 to point 1018 ("a") indicates utilization of all available observations and a maximum ISA (axis 1002) is obtained. However, moving to point 1010, by utilizing fewer observations, and thereby moving to point 1010 has a disproportionally lower reduction on the ISA as compared to the proportional decrease in ISA for a given decrease in observations for sensors having a non-ergodic (e.g., regular spacing) configuration (line 1016). Accordingly, line 1014 to point 1020 ("b") on axis 1004 illustrates the point wherein fewer observations has the least effect on ISA. Any further reduction from point 1010 towards the origin produces an enhanced reduction ISA. Accordingly, point 1010 indicates the greatest ratio of resource savings to least amount of ISA reduction.

Figure 11:
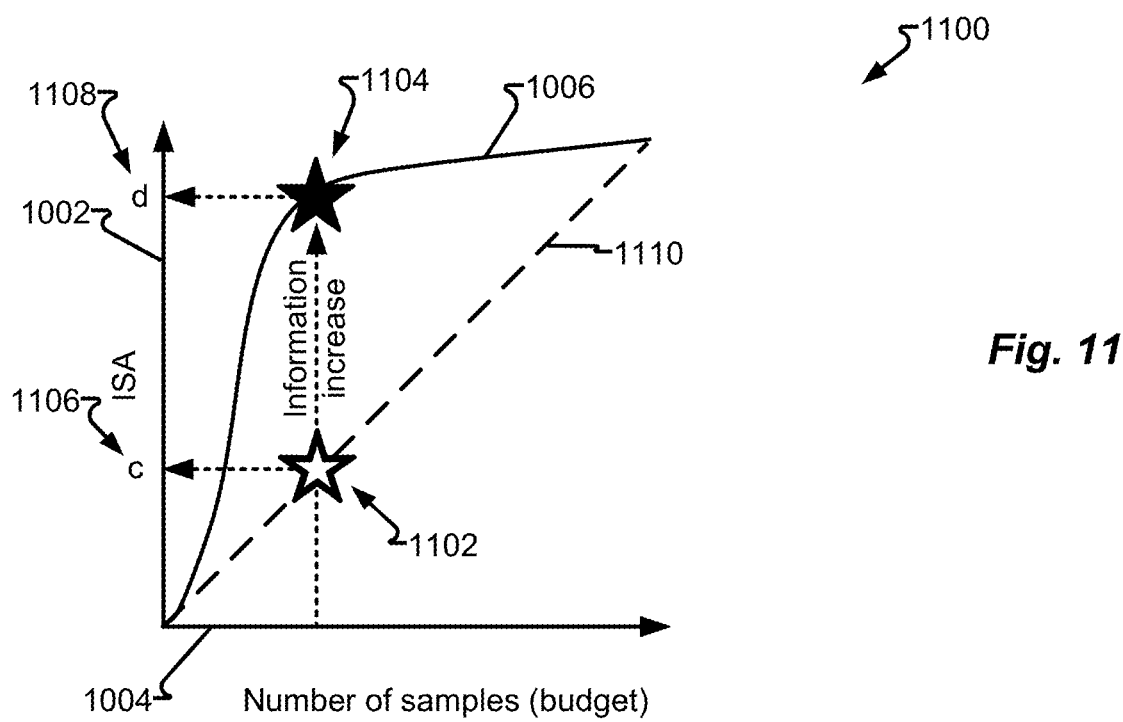
FIG. 11 depicts an optimization process in accordance with embodiments of the present disclosure.

FIG. 11 depicts optimization process 1100 in accordance with embodiments of the present disclosure. In one embodiment, process 1100 is, or comprises, step 904B (see FIG. 9). One benefit of ergodic sampling of an area is that the information of the data obtained increases more than linearly with a given increase in the number of sensing locations between points 1102 and 1104. A regularly spaced grid or line of sensors produces a greater resolution of data, illustrated by line 1110, in direct proportion to the number of observations.

The number of observations may be determined by the number of sensors deployed or the number of sensing locations utilized. For example, equipment utilized to place and relocate sensors for subsequent observations may be only available for use for a certain period of time and each sensing observation requiring a substantially fixed portion of that time. By using ergodic sampling, a less number of observations may be utilized from the number of samples 1018 reduce to 1020, but the ISA value of 1008 and 1010 are little changed. Therefore, using ergodic pattern, we save the number of sensors but no information change.

At point 1102, line 1012 indicates utilization of a given number of available observations and a corresponding ISA (axis 1002) is obtained. However, moving to point 1102, and transitioning from line 1110 to curve 1106 increases ISA without an increase in the observations and without a change along axis 1004. Accordingly, ISA at first point 1106 ("c") may be improved to point 1108 ("d") without the need to increase sensor observations.

Figure 12:
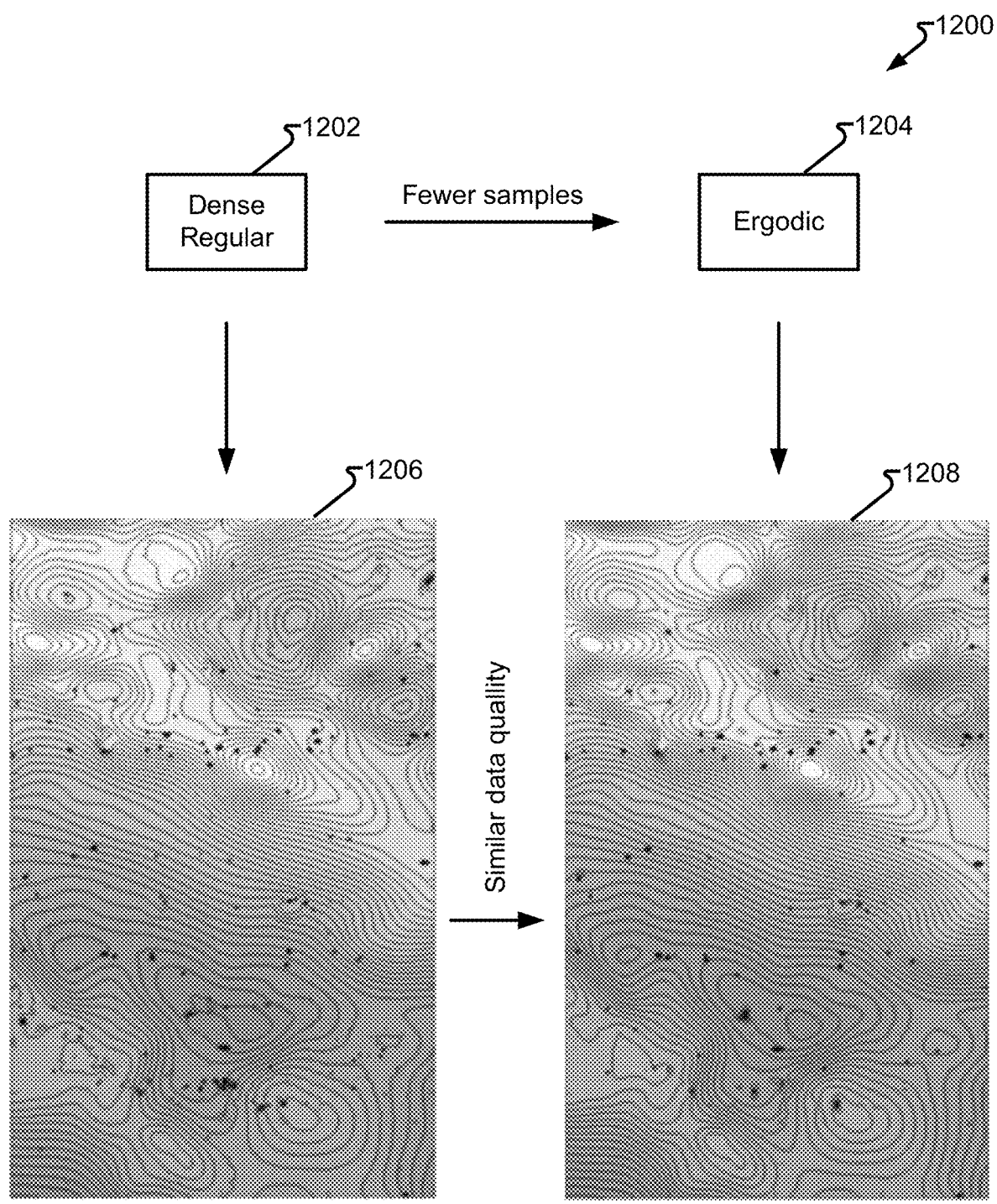
FIG. 12 depicts a comparison of dense regularly spaced location and ergodic configuration and data in accordance with embodiments of the present disclosure.

FIG. 12 depicts graph 1200 illustrating the transition from regular locations for sensing to ergodic locations. Regular spacing 1202 places locating points or lines at regular intervals, such as those illustrated by dense regularly spaced location configuration 1300 (See FIG. 13A), sparse regularly spaced location configuration 1400 (See FIG. 14A), dense regularly spaced line configuration 1500 (See FIG. 15A), and sparse regularly spaced line configuration 1700 (See FIG. 17A). Utilizing ergodic spacing 1204 places locating points or lines at ergodic intervals, such as those illustrated by ergodic linear point location configuration 300 (See FIG. 3A), two-dimensional ergodic point location configuration 400 (See FIG. 4), and ergodic line location configuration 1600 (See FIG. 16).

In one embodiment, ergodic spacing 1204 utilizes fewer sensors as compared to dense regular spacing 1202. The resulting ergodic sensing 1208 is the same as the result 1206, as compared to dense regular spacing 1202, but to a lesser extent than merely removing sensing locations from dense regular spacing 1202. As a benefit, the data acquisition, processing, storage, etc., is reduced disproportionately more than the reduction in data (e.g., lower resolution, lower bandwidth, etc.) gathered. In another embodiment, the number of sensor locations remains the same between sparse regular spacing and ergodic spacing 1204, but increases the data gathered (e.g., higher resolution, greater bandwidth, etc.).

Figure 13C:
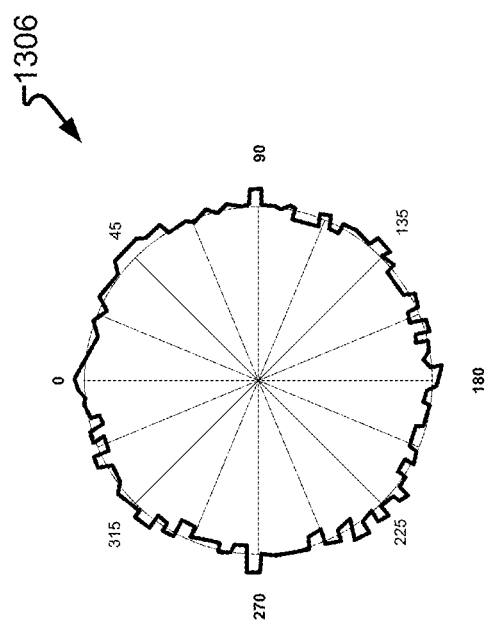
Figure 13B:
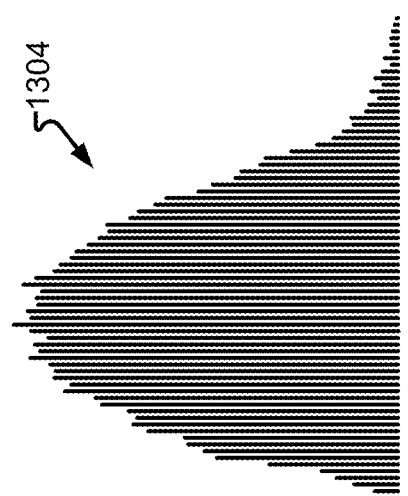
Figure 13F:
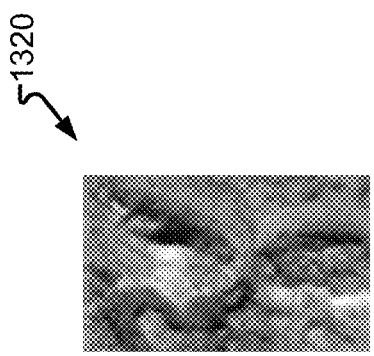

FIG. 13A-13F depicts dense regularly spaced location configuration 1300 in accordance with embodiments of the present disclosure. FIG. 13A illustrates points 1302 having a dense regular spacing within configuration 1300. FIG. 13B illustrates histogram 1304 indicating a distribution of the distances between pairs of points 1302. Histogram 1304 indicates a substantially uniform and predicable curve. Similarly, FIG. 13C illustrates the distribution 1306 of angles between pairs of points 1302 that, with minor variation, is uniform in all directions. FIG. 13D illustrates a uniform (e.g., average) distribution 1308 of density of points 1302 within configuration 1300. FIG. 13E illustrates spectral resolution function (SRF) plot 1310. Plot 1310 illustrates the SRF distribution of points 1302 along axis 1316 ("$K_X$") and axis 1318 ("$K_Y$") and comprises spike 1314 indicating the ideal resolution of a single spectral spike and 1312 illustrates the zero background in such a case when a full dense grid is used. FIG. 13F illustrates surface image 1320 as an example image of a surface imaged by sensors placed in accordance with points 1302 and producing surface image 1320 having a high degree of resolution.

Figure 14C:
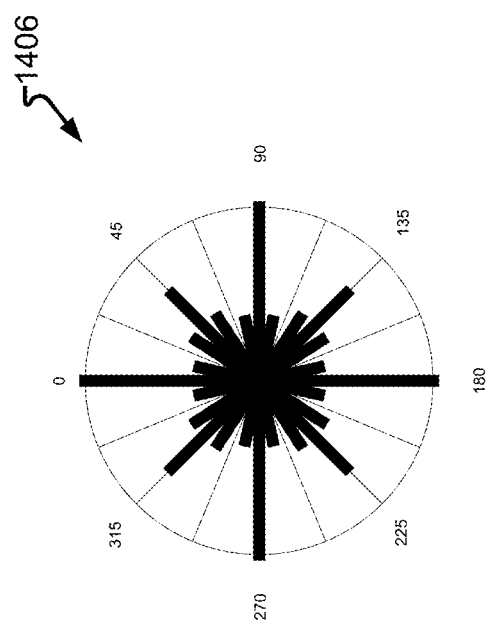
Figure 14B:
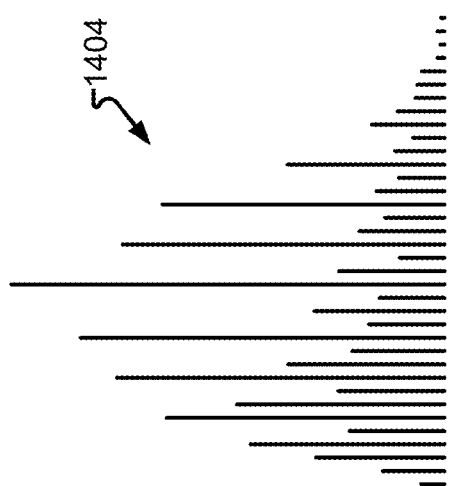
Figures 14D, 14E:
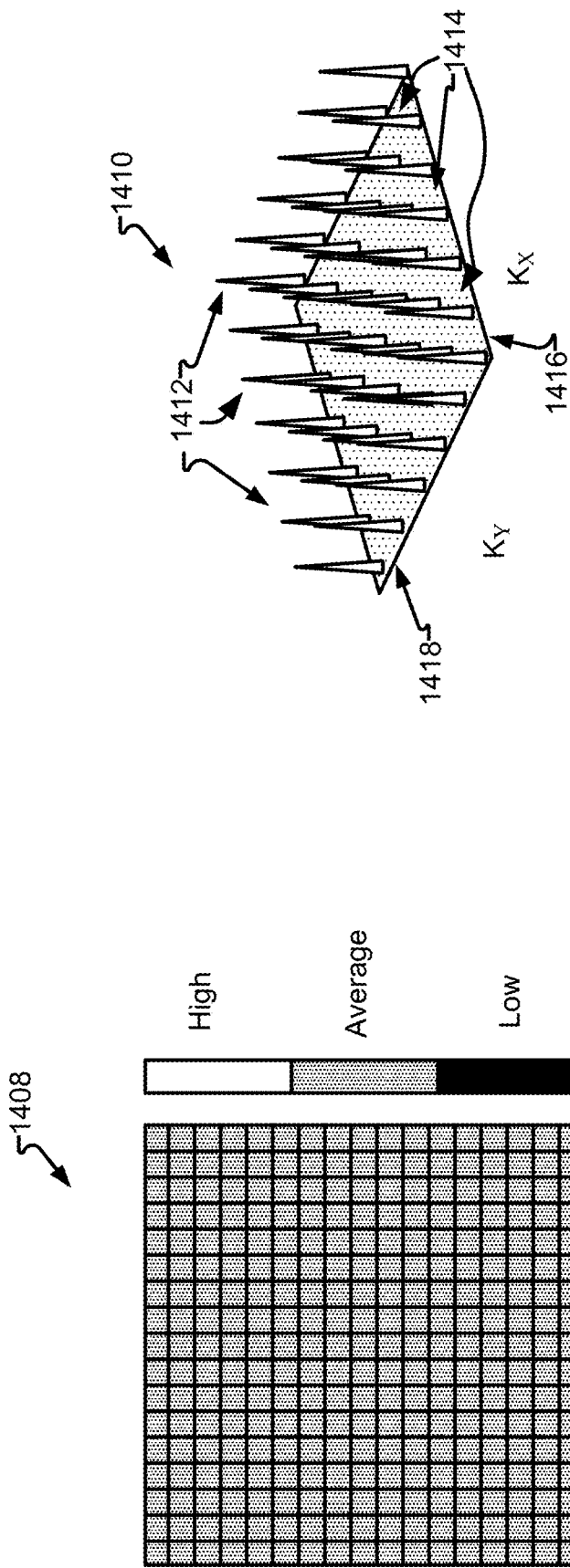
Figure 14F:

FIG. 14A-14F depicts sparse regularly spaced location configuration 1400 in accordance with embodiments of the present disclosure. FIG. 14A illustrates points 1402 having a sparse regular spacing within configuration 1400. FIG. 14B illustrates histogram 1404 indicating a distribution of the distances between pairs of points 1402. Histogram 1404 indicates a partially uniform and predicable curve but having less resolution when compared to histogram 1304 (FIG. 13B). Similarly, FIG. 14C illustrates the distribution 1406 of angles between pairs of points 1402 that, with a greater variation, but uniform in all directions. FIG. 14D illustrates a uniform (e.g., average) distribution 1408 of density of points 1402 within configuration 1400. FIG. 14E illustrates spectral resolution function (SRF) plot 1410. Plot 1410 illustrates the SRF distribution of points 1402 along axis 1416 ("$K_X$") and axis 1418 ("$K_Y$") and comprises spikes 1412 indicating poor resolution of the main peak and 1414 illustrates strong aliasing that make the recovery of the signal impossible. FIG. 14F illustrates surface image 1420 as an example image of a surface imaged by sensors placed in accordance with points 1402 and producing surface image 1420 having a lessor degree of resolution when compared to image 1320 (FIG. 13F).

Figure 15C:
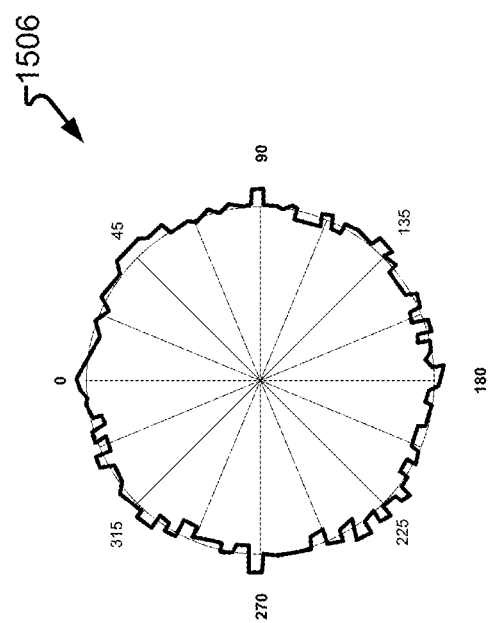

FIG. 15A-15F depicts a dense regularly spaced line location configuration 1500 in accordance with embodiments of the present disclosure. FIG. 15A illustrates lines 1502 illustrate a collection of points in a line or a continuous sensing line, such as may be obtained from a line of sensors fixed along the line or a vehicle, which may be a vehicle traversing a land surface or on or in a fluid (e.g., water surface, underwater, or airborne path). The distances between lines 1502 being dense and regularly spaced.

Figure 15B:
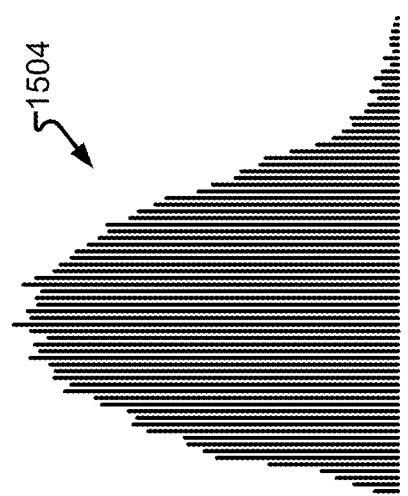
Figures 15D, 15E:
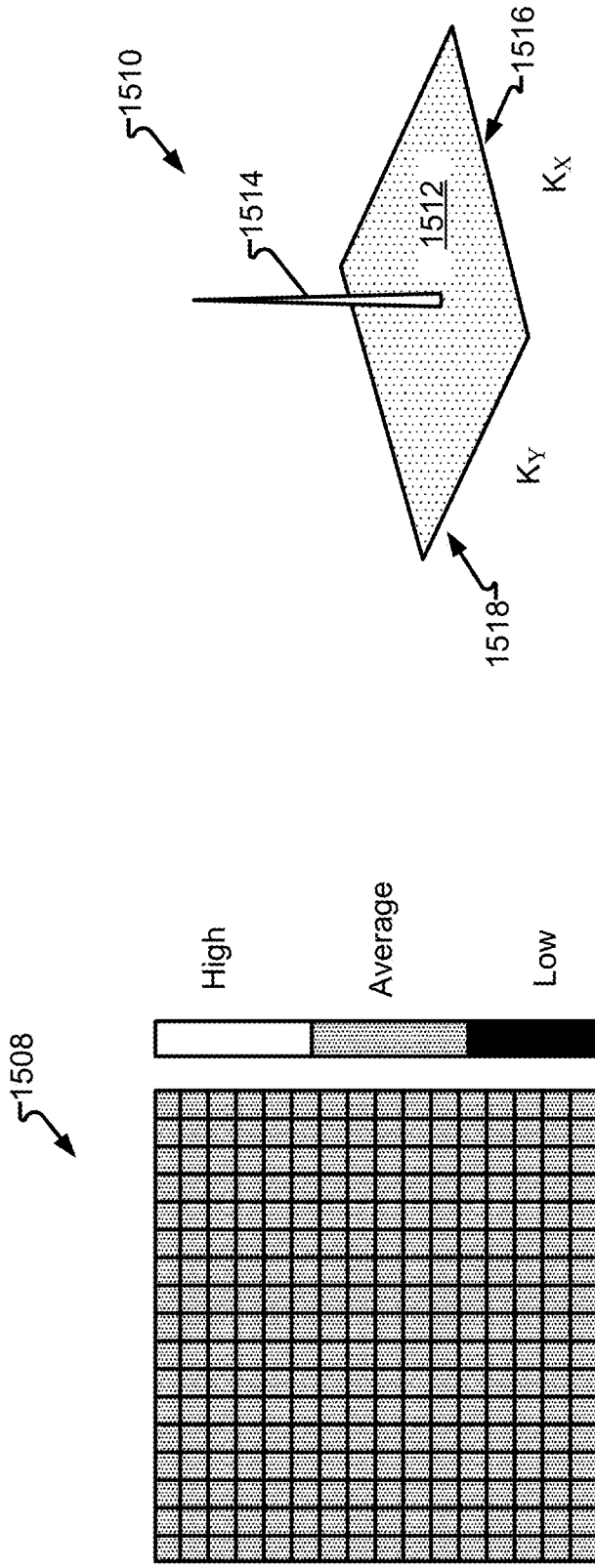
Figure 15F:
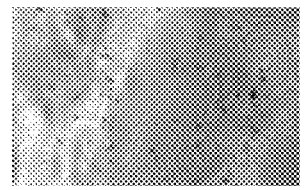

FIG. 15B illustrates histogram 1504 indicating a distribution of the distances between pairs of lines 1502. Histogram 1504 indicates a substantially uniform and predicable curve. Similarly, FIG. 15C illustrates the distribution 1506 of the angles between observations points along lines 1502. FIG. 15D illustrates a uniform (e.g., average) distribution 1508 of density of lines 1502 within configuration 1500. FIG. 15E illustrates spectral resolution function (SRF) plot 1510. FIG. 15E illustrates spectral resolution function (SRF) plot 1510. Plot 1510 illustrates the SRF distribution of points 1502 along axis 1516 ("$K_X$") and axis 1518 ("$K_Y$") and comprises spike 1514 indicating a perfect resolution of main peak and 1512 illustrates the zero background FIG. 15F illustrates surface image 1520 as an example image of a surface imaged by sensors placed in accordance with lines 1502 and producing surface image 1520 having a high degree of resolution.

Figure 16A:
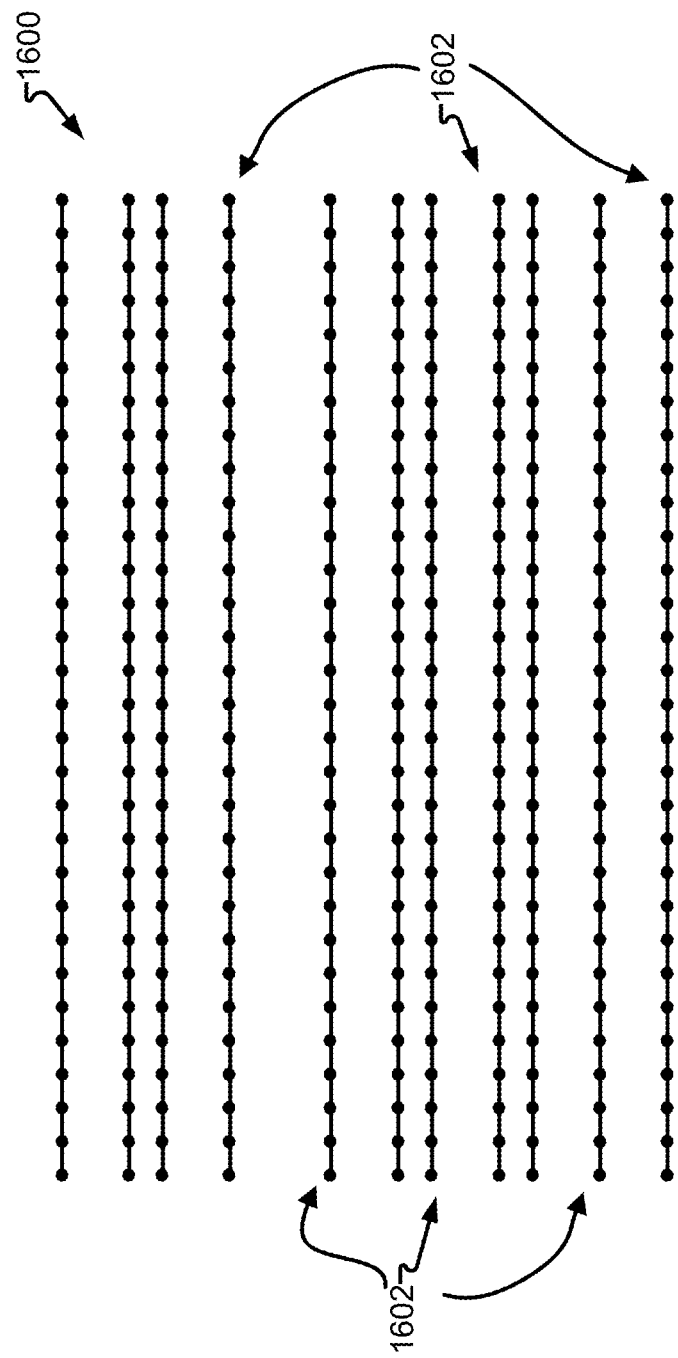

FIG. 16A-16F depicts an ergodic line location configuration 1600 in accordance with embodiments of the present disclosure. FIG. 16A illustrates lines 1602 illustrate a collection of points in a line or a continuous sensing line, such as may be obtained from a line of sensors fixed along the line or a vehicle, which may be a vehicle traversing a land surface, water surface, underwater, or airborne path. In one embodiment, the distances between lines 1602 being ergodically spaced and substantially parallel. In another embodiment, at least one line of lines 1602 are irregularly angled to at least one other of lines 1602 and be skew, within configuration 1600, or intersect.

Figure 16C:
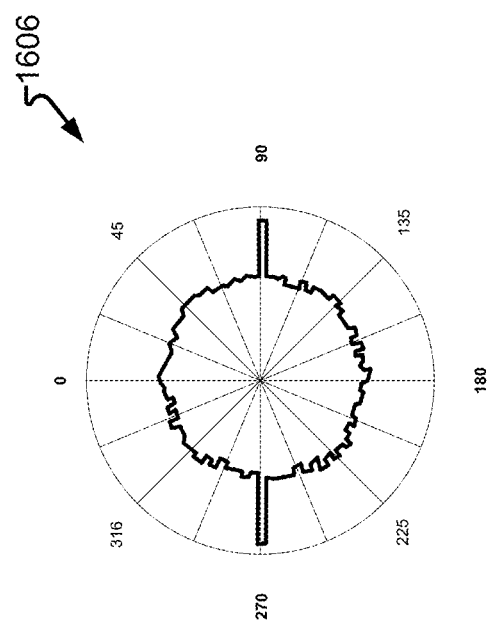
Figure 16B:
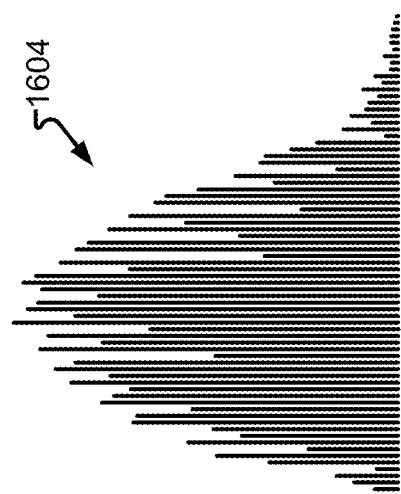
Figure 16F:
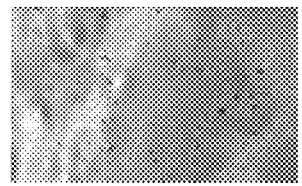

FIG. 16B illustrates histogram 1604 indicates a substantially uniform and predicable curve while having more variability as compared to histogram 1504 (FIG. 15B). Similarly, FIG. 16C illustrates the distribution 1606 of the angles between observations points along lines 1602 and indicating the linear configuration of observation points along each of lines 1602 and a roughly uniform distribution of other angles. FIG. 16D illustrates a uniform (e.g., average) distribution 1608 of density of lines 1602 within configuration 1600. FIG. 16E illustrates spectral resolution function (SRF) plot 1610. FIG. 16E illustrates spectral resolution function (SRF) plot 1610. Plot 1610 illustrates the SRF distribution of points 1602 along axis 1616 ("$K_X$") and axis 1618 ("$K_Y$") and comprising central spike 1612 indicating the improved SRF that resolves the main peak and secondary spikes 1614 linearly distributed and much smaller and indicating they have no effect on recovery of the signal FIG. 16F illustrates surface image 1620 as an example image of a surface imaged by sensors placed in accordance with lines 1602 and producing surface image 1620 having a high degree of resolution but someone less than a regularly spaced configuration of lines (e.g., image 1520 of FIG. 15F).

Figure 17A:
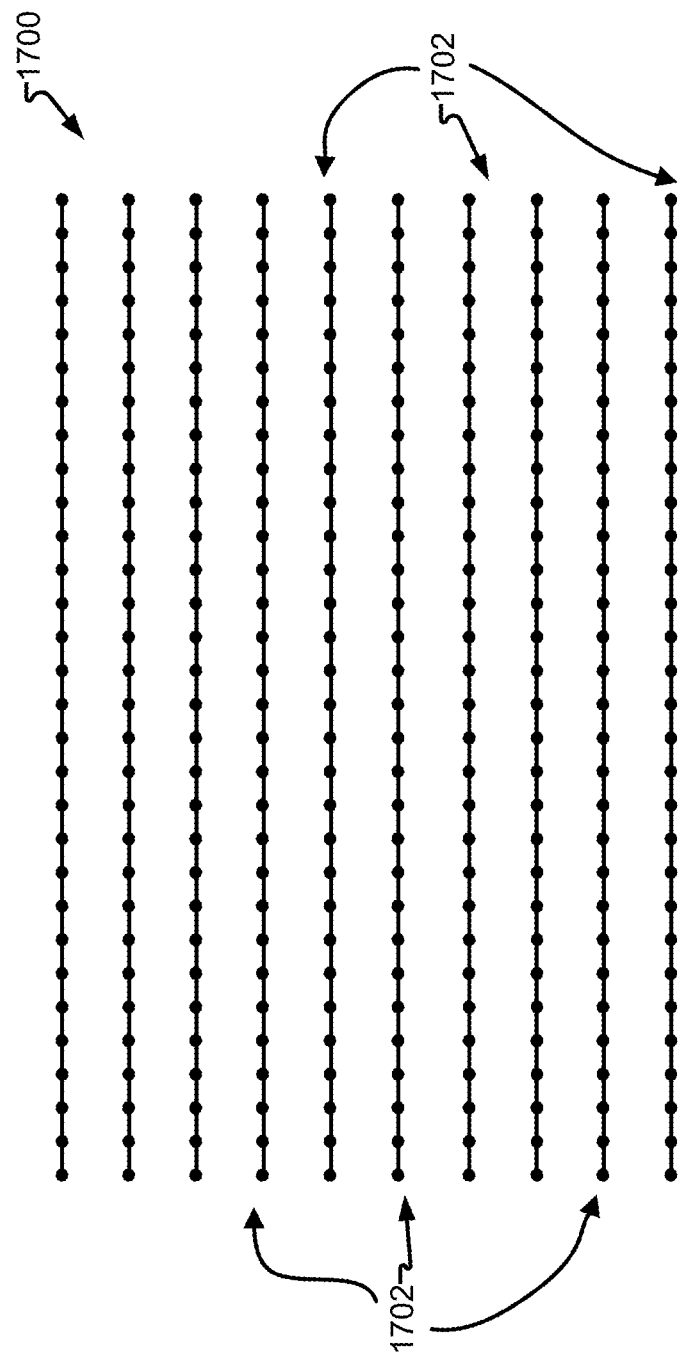

FIG. 17A-17F depicts a sparse regularly spaced line location configuration 1700 in accordance with embodiments of the present disclosure. FIG. 17A illustrates lines 1702 illustrate a collection of points in a line or a continuous sensing line, such as may be obtained from a line of sensors fixed along the line or a vehicle, which may be a vehicle traversing a land surface, water surface, underwater, or airborne path. The distances between lines 1702 being sparse and regularly spaced.

Figure 17C:
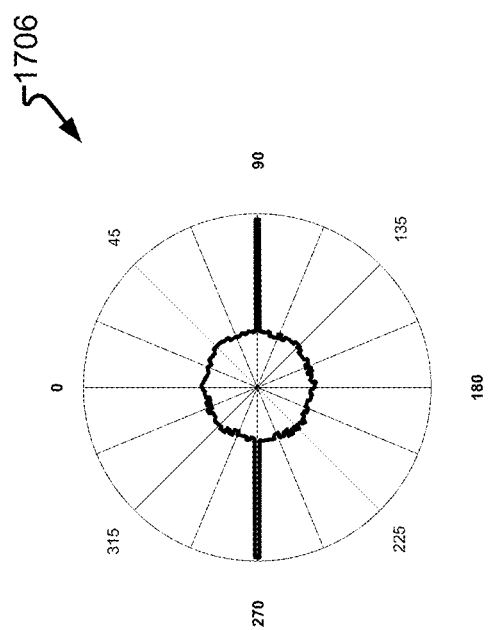
Figure 17B:
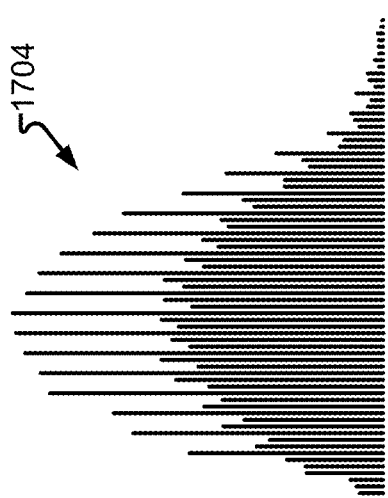
Figure 17F:
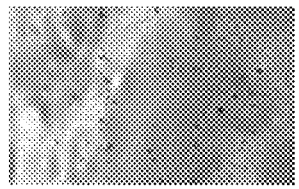

FIG. 17B illustrates histogram 1704 indicating a distribution of the distances between pairs of lines 1702. Histogram 1704 indicates a substantially uniform and predicable curves. Similarly, FIG. 17C illustrates the distribution 1706 of the angles between observations points along lines 1702. FIG. 17D illustrates a uniform (e.g., average) distribution 1708 of density of lines 1702 within configuration 1700. FIG. 17E illustrates spectral resolution function (SRF) plot 1710. FIG. 17E illustrates spectral resolution function (SRF) plot 1710. Plot 1710 illustrates the SRF distribution of points 1702 along axis 1716 ("$K_X$") and axis 1718 ("$K_Y$") and comprises spike 1714 indicating the aliasing, and cannot detect the correct spike or frequencies. FIG. 17F illustrates surface image 1720 as an example image of a surface imaged by sensors placed in accordance with lines 1702 and producing surface image 1720 having a lower degree of resolution as compared to image 1620 (FIG. 16F).

Figure 18:
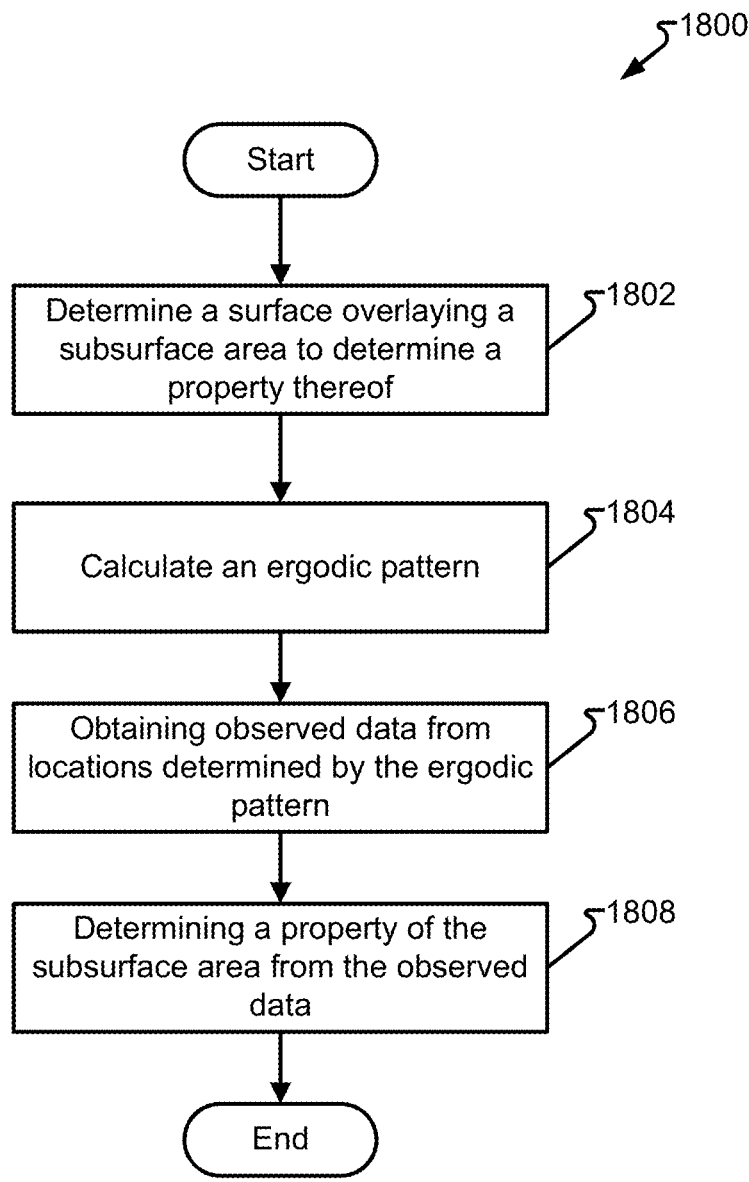
FIG. 18 depicts a process in accordance with embodiments of the present disclosure.

FIG. 18 depicts process 1800 in accordance with embodiments of the present disclosure. In one embodiment, process 1800 is embodied as machine-readable instructions maintained in a non-transitory memory that when read by a machine, such as a microprocessor(s), cause the machine to perform the steps of process 1800. Process 1800 begins and, at step 1802 a surface overlaying a subsurface volume is identified or determined to be surveyed with a plurality of sensing observations.

In order to place the sensors at the appropriate location, step 1804 determines an ergodic pattern (e.g., points, points on a line, continuous lines, etc.), as described in more detail in the embodiments herein. Step 1806 then obtains data from the sensors when at the locations determined by step 1804 and, in step 1808, a subsurface property is determined.

In another embodiment, a processor may direct a vehicle (e.g., aircraft, watercraft, submarine, surface vehicle, etc.) to a physical location corresponding to a location of the ergodic pattern determined in step 1804. Additionally or alternatively, the processor may initiate sensing to cause the vehicle to activate a sensor on board the vehicle and thereby collect data from the sensor when the vehicle location coincides with the physical location. For example, the path of an aircraft may be the same or different from the ergodic pattern determined in step 1804, such as a series regularly spaced parallel lines over a surface. While the aircraft navigates over the subject area, the processor times activation of a sensor when the aircraft passing over a corresponding location of the ergodic pattern determined in step 1804.

In another embodiment, a processor may present or cause to present a number of sensing locations on a display, each location being an indicia of one location of the ergodic pattern determined in step 1804. The indicia of the position closes to a sensor delivery vehicle moved to be in a more (or most) prominent point on the display.

In another embodiment, step 1804 may initially generate a random set of observation locations (points or lines) as a seed for determining whether the generated observation locations satisfy an ergodic pattern. If the pattern is ergodic, the pattern is utilized. If the pattern is not ergodic, the pattern is altered and the result evaluated to be more or less ergodic. The alteration may comprise one or more of adding, removing, or relocating a point or, when sensing is performed via sensing lines, rotating at least one sensing line. If the processor determines the pattern is less ergodic, the alteration is restored and/or an opposing alteration to the original alteration is applied. As a result, the processor may generate an ergodic pattern or, when a non-ergodic pattern is generated, automatically modify the pattern to produce an ergodic pattern.

Figure 19:
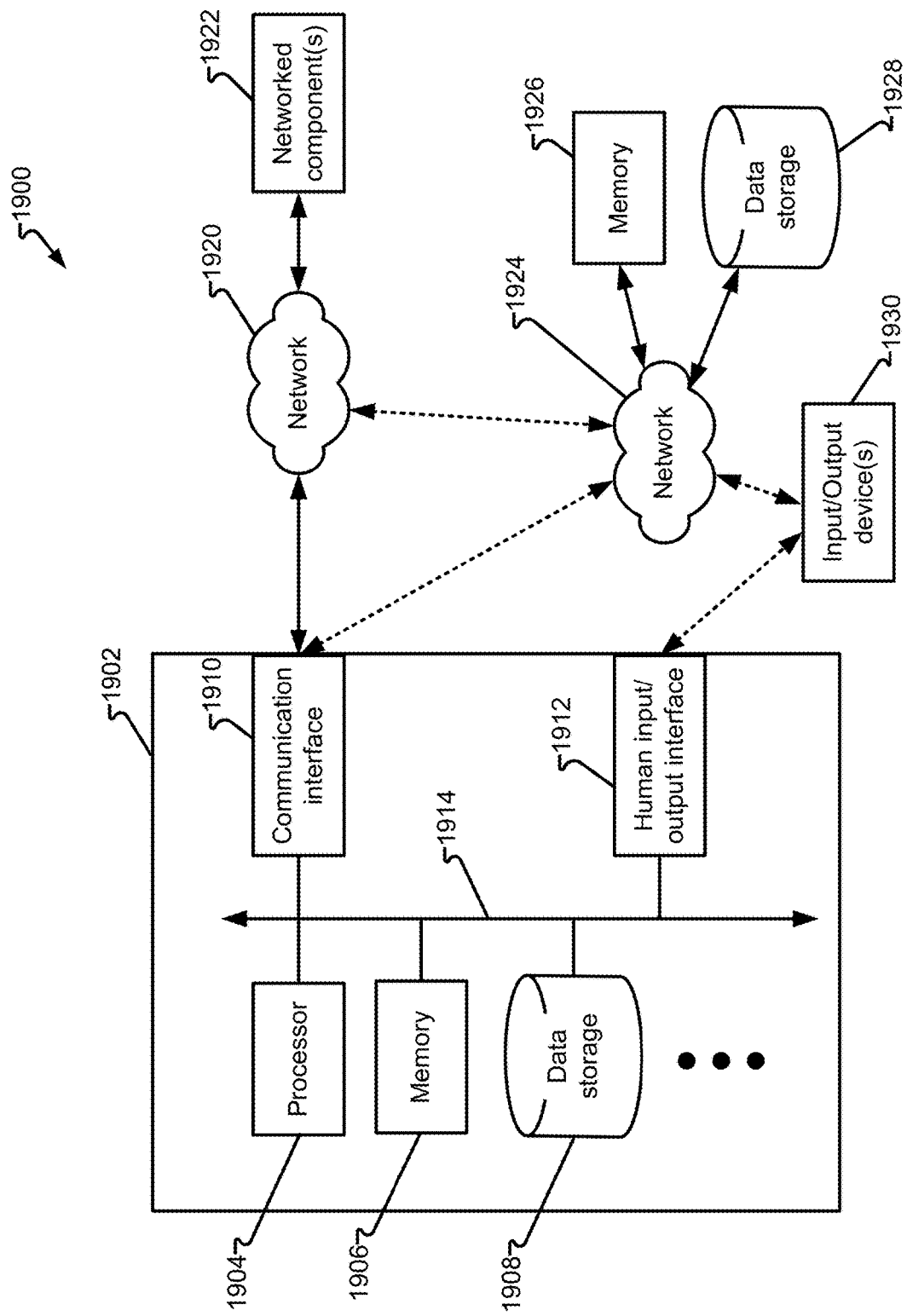
FIG. 19 depicts a system in accordance with embodiments of the present disclosure.

FIG. 19 depicts device 1902 in system 1900 in accordance with embodiments of the present disclosure. In one embodiment, device 1902 comprising various components and connections to other components and/or systems and carries out operations described herein. The components are variously embodied and may comprise processor 1904. The term "microprocessor" or, more simply, "processor," refers exclusively to electronic hardware components comprising electrical circuitry with connections (e.g., pin-outs) to convey encoded electrical signals to and from the electrical circuitry. Processor 1904 may comprise programmable logic functionality, such as determined, at least in part, from accessing machine-readable instructions maintained in a non-transitory data storage, which may be embodied as circuitry, on-chip read-only memory, computer memory 1906, data storage 1908, etc., that cause the processor 1904 to perform the steps of the instructions. Processor 1904 may be further embodied as a single electronic microprocessor or multi-processor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 1914, executes instructions, and outputs data, again such as via bus 1914. In other embodiments, processor 1904 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 1904 is a non-transitory computing device (e.g., electronic machine comprising circuitry and connections to communicate with other components and devices). Processor 1904 may operate a virtual processor, such as to process machine instructions not native to the processor (e.g., translate the VAX operating system and VAX machine instruction code set into Intel® 9xx chipset code to enable VAX-specific applications to execute on a virtual VAX processor). However, as those of ordinary skill understand, such virtual processors are applications executed by hardware, more specifically, the underlying electrical circuitry and other hardware of the processor (e.g., processor 1904). Processor 1904 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 1904, device 1902 may utilize computer memory 1906 and/or data storage 1908 for the storage of accessible data, such as instructions, values, etc. Communication interface 1910 facilitates communication with components, such as processor 1904 via bus 1914 with components not accessible via bus 1914. Communication interface 1910 may be embodied as a network port, card, cable, or other configured hardware device. Additionally or alternatively, human input/output interface 1912 connects to one or more interface components to receive and/or present information (e.g., instructions, data, values, etc.) to and/or from a human and/or electronic device. Examples of input/output devices 1930 that may be connected to input/output interface include, but are not limited to, keyboard, mouse, trackball, printers, displays, sensor, switch, relay, speaker, microphone, still and/or video camera, etc. In another embodiment, communication interface 1910 may comprise, or be comprised by, human input/output interface 1912. Communication interface 1910 may be configured to communicate directly with a networked component or configured to utilize one or more networks, such as network 1920 and/or network 1924.

Network 1920 may be a wired network (e.g., Ethernet), wireless (e.g., WiFi, Bluetooth, cellular, etc.) network, or combination thereof and enable device 1902 to communicate with networked component(s) 1922. In other embodiments, network 1920 may be embodied, in whole or in part, as a telephony network (e.g., public switched telephone network (PSTN), private branch exchange (PBX), cellular telephony network, etc.).

Additionally or alternatively, one or more other networks may be utilized. For example, network 1924 may represent a second network, which may facilitate communication with components utilized by device 1902. For example, network 1924 may be an internal network to a business entity or other organization, whereby components are trusted (or at least more so) than networked components 1922, which may be connected to network 1920 comprising a public network (e.g., Internet) that may not be as trusted.

Components attached to network 1924 may include computer memory 1926, data storage 1928, input/output device(s) 1930, and/or other components that may be accessible to processor 1904. For example, computer memory 1926 and/or data storage 1928 may supplement or supplant computer memory 1906 and/or data storage 1908 entirely or for a particular task or purpose. As another example, computer memory 1926 and/or data storage 1928 may be an external data repository (e.g., server farm, array, "cloud," etc.) and enable device 1902, and/or other devices, to access data thereon. Similarly, input/output device(s) 1930 may be accessed by processor 1904 via human input/output interface 1912 and/or via communication interface 1910 either directly, via network 1924, via network 1920 alone (not shown), or via networks 1924 and 1920. Each of computer memory 1906, data storage 1908, computer memory 1926, data storage 1928 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 1930 may be a router, a switch, a port, or other communication component such that a particular output of processor 1904 enables (or disables) input/output device 1930, which may be associated with network 1920 and/or network 1924, to allow (or disallow) communications between two or more nodes on network 1920 and/or network 1924. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components by, in one or more embodiments, voltages in memory circuits, configuration of switching circuits, and/or by selective use of particular logic gate circuits. Additionally or alternatively, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessors may be integrated into a single processing appliance (e.g., computer, server, blade, etc.) or located entirely, or in part, in a discrete component and connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, a first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing resource of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A method of determining a property of a subsurface volume, comprising:
   determining a surface area overlaying the subsurface volume;

calculating an ergodic pattern comprising a set of locations on the surface area;
obtaining observed data from the subsurface volume at each of the set of locations; and
determining, from the observed data, the property of the subsurface volume; and
wherein calculating the ergodic pattern comprises, selecting the set of locations in accordance with the equation:

$$\Phi^* = \underset{\Phi}{\operatorname{argmax}} \omega_\alpha S(\alpha_\Phi, \alpha_\theta) + \omega_\beta S(\beta_\Phi, \beta_\theta) + \omega_\gamma S(\gamma_\Phi, \gamma_\theta) + \mu_\Phi S(\xi_\Phi, 0)$$

wherein:
$\Phi^*$=Ergodic pattern;
$\Phi$=Irregular pattern;
$\Theta$=Dense regular grid;
S=Similarity function which is selected from one of entropy, cross-correlation, L1 norm, and L2 norm;
$\omega_\alpha$, $\omega_\beta$, $\omega_\gamma$=weights;
$\alpha$=Interval distribution of all sample pairs;
$\beta$=Angle distribution of all sample pairs;
$\gamma$=Sample density function;
$\xi$=Parameter from spectral resolution function (SRF);
$\mu$=Parameter spectral resolution function (SRF); and
$\delta$=Sample percentage.

2. The method of claim 1, wherein the set of locations consist of locations calculated solely by the ergodic pattern and omit any location not determined by the ergodic pattern.

3. The method of claim 1, wherein obtaining the observed data from the subsurface volume at each of the set of locations comprises deploying a plurality of sensors at a corresponding plurality of the locations and receiving the observed data from each of the plurality of sensors substantially concurrently.

4. The method of claim 1, wherein obtaining the observed data from the subsurface volume at each of the set of locations comprises deploying a sensor sequentially to traverse each of a plurality of the locations and receiving a portion of the observed data from the sensor when located at each of the plurality of the locations.

5. The method of claim 4, comprising traversing the sensor on the surface area and automatically obtaining the portion of the observed data from the sensor upon the sensor being located at one of the plurality of locations.

6. The method of claim 1, wherein the surface area comprises a surface of a fluid layer.

7. The method of claim 6, wherein the surface area comprises at least a portion of the fluid layer above the subsurface volume.

8. The method of claim 6, wherein the surface area comprises at least one of a body of water and a gaseous atmosphere.

9. The method of claim 1, further comprising:
repeating the ergodic pattern onto a subsequent surface area;
obtaining subsequent observed data from a subsequent subsurface volume at each of the set of locations overlaying the subsequent surface area; and
determining, from the subsequent observed data, a property of the subsequent subsurface volume.

10. The method of claim 1, wherein the set of locations comprise a set of points.

11. The method of claim 1, wherein the set of locations comprises a set of parallel tracks and wherein the ergodic pattern determines the distance between the set of parallel tracks.

12. A system for determining a property of a subsurface volume, comprising:
at least one microprocessor coupled with a computer memory comprising computer readable instructions; and
wherein the at least one microprocessor performs:
determining a surface area overlaying the subsurface volume;
calculating an ergodic pattern comprising a set of locations on the surface area;
obtaining observed data from the subsurface volume at each of the set of locations; and
determining, from the observed data, the property of the subsurface volume; and
wherein calculating the ergodic pattern comprises, selecting the set of locations in accordance with the equation:

$$\Phi^* = \underset{\Phi}{\operatorname{argmax}} \omega_\alpha S(\alpha_\Phi, \alpha_\theta) + \omega_\beta S(\beta_\Phi, \beta_\theta) + \omega_\gamma S(\gamma_\Phi, \gamma_\theta) + \mu_\Phi S(\xi_\Phi, 0)$$

wherein:
$\Phi^*$=Ergodic pattern;
$\Phi$=Irregular pattern;
$\Theta$=Dense regular grid;
S=Similarity function which is selected from one of entropy, cross-correlation, L1 norm, and L2 norm;
$\omega_\alpha$, $\omega_\beta$, $\omega_\gamma$=weights;
$\alpha$=Interval distribution of all sample pairs;
$\beta$=Angle distribution of all sample pairs;
$\gamma$=Sample density function;
$\xi$=Parameter from spectral resolution function (SRF);
$\mu$=Parameter spectral resolution function (SRF); and
$\delta$=Sample percentage.

13. The system of claim 12, wherein the set of locations consist of locations calculated solely by the ergodic pattern and omit any location not determined by the ergodic pattern.

14. The system of claim 12, wherein the microprocessor obtains the observed data from the subsurface volume at each of the set of locations comprising obtaining data from a plurality of sensors deployed at a corresponding plurality of the locations and receiving the observed data from each of the plurality of sensors substantially concurrently.

15. The system of claim 12, wherein the microprocessor obtains the observed data from the subsurface volume at each of the set of locations comprising obtaining the observed data from a sensor deployed sequentially to traverse each of a plurality of the locations and receiving a portion of the observed data from the sensor when located at each of the plurality of the locations.

16. The system of claim 15, comprising traversing the sensor on the surface area and automatically obtaining the portion of the observed data from the sensor upon the sensor being located at one of the plurality of locations.

17. The system of claim 12, wherein the surface area comprises a surface of a body of water.

18. A system for determining a property of a subsurface volume, comprising:
means to determine a surface area overlaying the subsurface volume;
means to calculate an ergodic pattern comprising a set of locations on the surface area;
means to obtain observed data from the subsurface volume at each of the set of locations; and
means to determine, from the observed data, the property of the subsurface volume; and wherein the means to calculate the ergodic pattern comprises, means to select the set of locations in accordance with the equation:

$$\Phi^* = \underset{\Phi}{\mathrm{argmax}}\, \omega_\alpha S(\alpha_\Phi, \alpha_\theta) + \omega_\beta S(\beta_\Phi, \beta_\theta) + \omega_\gamma S(\gamma_\Phi, \gamma_\theta) + \mu_\Phi S(\xi_\Phi, 0)$$

wherein:
$\Phi^*$=Ergodic pattern;
$\Phi$=Irregular pattern;
$\Theta$=Dense regular grid;
S=Similarity function which is selected from one of entropy, cross-correlation, L1 norm, and L2 norm;
$\omega_\alpha$, $\omega_\beta$, $\omega_\gamma$=weights;
$\alpha$=Interval distribution of all sample pairs;
$\beta$=Angle distribution of all sample pairs;
$\gamma$=Sample density function;
$\xi$=Parameter from spectral resolution function (SRF);
$\mu$=Parameter spectral resolution function (SRF); and
$\delta$=Sample percentage.

19. The system of claim 18, wherein the set of locations consist of locations calculated solely by the ergodic pattern and omit any location not determined by the ergodic pattern.

20. The system of claim 18, wherein the means to obtain the observed data from the subsurface volume at each of the set of locations comprises deploying a plurality of sensors at a corresponding plurality of the locations and receiving the observed data from each of the plurality of sensors substantially concurrently.

* * * * *